(12) United States Patent
Kennedy et al.

(10) Patent No.: US 11,132,753 B2
(45) Date of Patent: Sep. 28, 2021

(54) METHOD, SYSTEM AND COMPUTER-READABLE MEDIUM FOR MANAGING AND COLLECTING RECEIVABLES

(71) Applicant: Ontario Systems, LLC, Muncie, IN (US)

(72) Inventors: Amy Kennedy, Midlothian, VA (US); Tyler Roark, Yorktown, IN (US); Kenneth Couch, Muncie, IN (US); Benjamin Kolb, Economy, IN (US); Matt Holcomb, Anderson, IN (US); Seth Corduan, Muncie, IN (US); Amy Friddle, Muncie, IN (US); Chris Repp, Pendleton, IN (US); Josh Sprague, Muncie, IN (US)

(73) Assignee: Ontario Systems, LLC, Muncie, IN (US)

( * ) Notice: Subject to any disclaimer, the term of this patent is extended or adjusted under 35 U.S.C. 154(b) by 0 days.

(21) Appl. No.: 16/744,725

(22) Filed: Jan. 16, 2020

(65) Prior Publication Data

US 2020/0294155 A1 Sep. 17, 2020

Related U.S. Application Data

(63) Continuation of application No. 14/215,750, filed on Mar. 17, 2014, now abandoned, which is a
(Continued)

(51) Int. Cl.
*G06Q 40/00* (2012.01)
*G06Q 40/02* (2012.01)

(52) U.S. Cl.
CPC ............ *G06Q 40/12* (2013.12); *G06Q 40/02* (2013.01)

(58) Field of Classification Search
None
See application file for complete search history.

(56) References Cited

U.S. PATENT DOCUMENTS

| 5,436,965 | A | * | 7/1995 | Grossman | ............... | H04M 3/36 379/112.01 |
| 5,889,799 | A | * | 3/1999 | Grossman | ............... | H04M 3/36 379/266.08 |

(Continued)

OTHER PUBLICATIONS

S. Moazeni, "Predicting Individual-Level Call Arrival from Online Account Customer Activity," 2018 IEEE International Conference on Big Data (Big Data), 2018, pp. 1624-1631, (Call Arrival). (Year: 2018).*

*Primary Examiner* — Chikaodinaka Ojiaku
(74) *Attorney, Agent, or Firm* — Maginot, Moore & Beck LLP

(57) ABSTRACT

Methods, systems, and computer-readable media for managing and collecting receivables are disclosed. A method for the management and collection of receivables includes performing collection activities with a telephone system. The method further includes tracking collection activity results for each of at least two telephone numbers associated with the debtor record over a period of time. The debtor record is inserted into a dynamic contact queue based on an overall contactability score for one of the at least two telephone numbers associated with the debtor. Account information associated with the debtor record is displayed based on the next-to-call position of the contact information associated with the debtor in the dynamic contact queue. The debtor is then automatically called using one of the telephone numbers associated with the debtor.

12 Claims, 47 Drawing Sheets

Related U.S. Application Data continuation-in-part of application No. 13/717,194, filed on Dec. 17, 2012, now abandoned, which is a continuation of application No. 13/106,676, filed on May 12, 2011, now Pat. No. 8,335,740.

(60) Provisional application No. 61/793,091, filed on Mar. 15, 2013, provisional application No. 61/444,567, filed on Feb. 18, 2011, provisional application No. 61/418,345, filed on Nov. 30, 2010, provisional application No. 61/333,888, filed on May 12, 2010.

(56) References Cited

U.S. PATENT DOCUMENTS

| | | | | |
|---|---|---|---|---|
| 5,930,764 | A * | 7/1999 | Melchione | G06Q 40/00 705/7.29 |
| 6,700,960 | B1 * | 3/2004 | Kaufman | H04M 15/00 379/112.01 |
| 7,006,994 | B1 * | 2/2006 | Campbell | G06Q 20/102 705/40 |
| 7,546,262 | B1 * | 6/2009 | Ferguson | G06Q 40/00 705/35 |
| 8,812,482 | B1 * | 8/2014 | Kapoor | G06F 16/273 707/713 |
| 2002/0128960 | A1 * | 9/2002 | Lambiotte | G06Q 40/025 705/38 |
| 2007/0043659 | A1 * | 2/2007 | Kass | G06Q 30/02 705/38 |
| 2008/0077525 | A1 * | 3/2008 | Willey | G06Q 20/102 705/40 |
| 2008/0118050 | A1 * | 5/2008 | Rodenbusch | H04M 3/5158 379/265.02 |
| 2009/0222384 | A1 * | 9/2009 | Rowan | G06Q 30/00 705/80 |
| 2009/0234874 | A1 * | 9/2009 | Sylvain | G06Q 10/107 |
| 2010/0287093 | A1 * | 11/2010 | He | G06Q 40/025 705/38 |
| 2011/0194679 | A1 * | 8/2011 | Patisaul | H04M 15/00 379/142.04 |
| 2013/0060587 | A1 * | 3/2013 | Bayrak | G06Q 10/10 705/7.11 |
| 2013/0090098 | A1 * | 4/2013 | Gidwani | H04M 1/72451 455/414.1 |

\* cited by examiner

| STATUS | SUSPEND UNTIL 03/14/2014 IN PHASE COLLECTION | LOAD ACCT | RALPH SMITH FOR $900.00 IN 3 ACCOUNT ACCOUNT: 735 | | FIRST CREDIT (GET CREDIT) IN RP UNIT FIRSTCREDIT, FIRST CREDIT COLLECTION; AS ID PA4 | | | | CEASE COMMUNICATIONS | |
|---|---|---|---|---|---|---|---|---|---|---|
| ACTIVITY | SESSION: 05:30 TOTAL: 00.00 %DEFAULTTEAM | CALL 7 | CONTACT 6 | LETTER 1 | TODAY 3/13 | YESTERDAY NOTHING | THIS WEEK WORKING | LAST WEEK 2/20 2/15 | YEAR 12/13 |

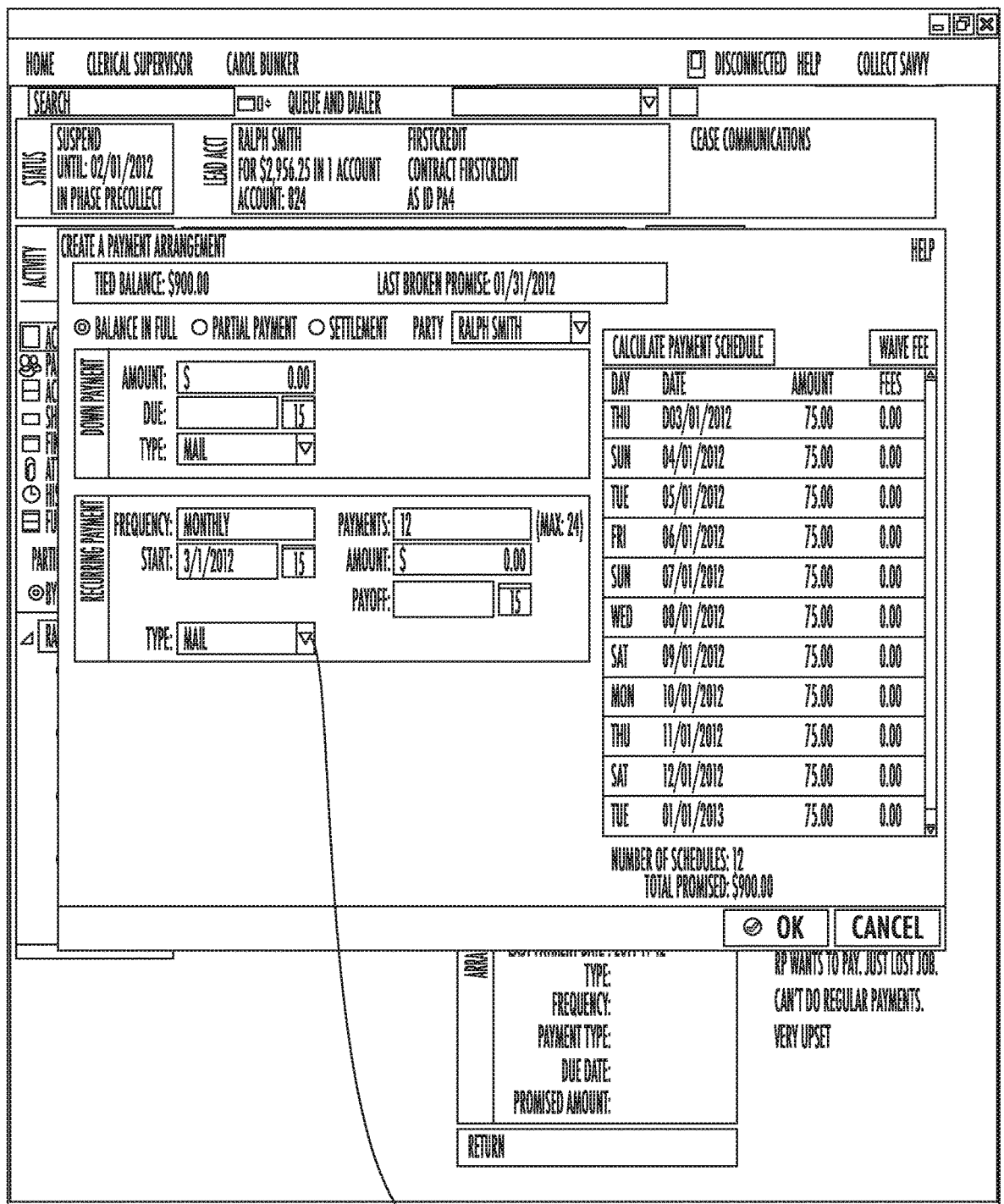
FIG. 21D-I

FIG. 21D-II

DOWN PAYMENT- CREDIT CARD ENTRY
CREDIT CARD MASTERCARD
NUMBER: [       ] ☐ SHOW
EXPIRATION: [▽] / [▽]
☐ KEEP CREDIT CARD ON FILE

25M

HELP

◉ USE CURRENT PARTY  ○ OTHER

NAME ON CARD: [PETER] [PARKER]
ADDRESS: [441 WINDING WAY]
[        ]
CITY: [MONERO]
STATE POSTAL: [IN ▽] [47303]
COUNTY: [        ]

[⊘ OK] [CANCEL]

25P

FIG. 21D-III

```
┌─────────────────────────────────────────────────────────┐
│ FINISH CONVERSTION                                 HELP │
│                                                         │
│              WHAT HAPPENED DURING THE PHONE CALL?       │
│                       (765)751-0075                     │
│                                                         │
│   TALKED TO AN RP:    CONFRIMED GOOD NUMBER FOR AN RP   │
│   ☐ TIM BROWN           ○ OTHER PERSON   LEFT MESSAGE   │
│                         ○ VOICEMAIL      LEFT MESSAGE   │
│                       COULD NOT CONFIRM NUMBER FOR AN RP:│
│                         ○ OTHER PERSON   LEFT MESSAGE   │
│                         ○ VOICEMAIL      LEFT MESSAGE   │
│                       ○ WRONG NUMBER FOR ALL RPS        │
│                       ○ THIS WAS THE WRONG ACCOUNT FOR THIS NUMBER │
│       ADD NOTE:                                         │
│       ┌─────────────────────────────────────────────┐   │
│       │                                             │   │
│       └─────────────────────────────────────────────┘   │
│                                               ┌──────┐  │
│                                               │ ⊘ OK │  │
│                                               └──────┘  │
└─────────────────────────────────────────────────────────┘

SCHEDULE CALL BACK

PARTY: TIM BROWN

TEAM: %DEFAULTEAM ▷
USER: TYLER ▷
DATE: 03/14/2013  15
TIME: ☐
PHONE: (765) 751-0075  OR  (___) ___-____
COMMENTS:

CALL BACKS ON 03/14/2013

| TIME | ACCOUNT | NAME |
|---|---|---|
| 2:30 PM | 757 | SAMUEL COLT |

HELP

◉ OK   CANCEL

FIG. 21H

```
CALLBACK                                                          HELP
              YOUR TEAM HAS A CALLBACK DUE FOR THIS ACCOUNT
         TIM BROWN ON 03/14/2013 AT 10:30 AM    DIAL (765)751-0075

SNOOZE THE CALLBACK:            UPDATE THE CALLBACK:
  [ 5 ] [ 15 ] [ 30 ] MINUTES   IS COMPLETE? [ ]
                                SCHEDULED DATE: [03/14/2013] [15]
                                          TIME: [10:30 AM]
DISMISS THE CALLBACK:                     TEAM: [%DEFAULTEAM    ▽]
[DISMISS]                                 USER: [TYLER          ▽]
                                      COMMENTS: [DISCUSS PAYMENT AFTER PAY
                                                 DAY.]

[ ⊘ OK ] [ CANCEL ]
```

PARTIES AND ACCOUNTS IN SET
⊙ BY ACCOUNT  ○ BY PARTY

△ 824, ABC
  $2,956.25
      TYE LERR
      MISSES LERR
      CEASE

EMPLOYMENT
NAME:
ADDRESS:
VERIFIED?:
PHONE:

PHONES(3)
TYPE/NUM
🏠 (761)
📱 (765)
🏠 (765)

ADD A

PRIMARY
MIKE   MILLS
T384BI GOOD ADDRESS AVE
GOOD ADDR AK 87812
VERIFIED?____  BAD?____
SSN: NO SSN ON FILE
DOB:

EMPLOYMENT
NAME:
ADDRESS:
VERIFIED?:
PHONE:

ACCOUNT

LANCES

METHOD, SYSTEM AND COMPUTER-READABLE MEDIUM FOR MANAGING AND COLLECTING RECEIVABLES

CROSS-REFERENCE TO RELATED APPLICATIONS

This application is a continuation of U.S. patent application Ser. No. 14/215,750, filed Mar. 17, 2014, which (i) is related to and claims the priority benefit of U.S. provisional patent application Ser. No. 61/793,091, filed Mar. 15, 2013, and (ii) is a continuation in part of U.S. patent application Ser. No. 13/717,194, filed Dec. 17, 2012, which is a continuation application of and claims priority to U.S. patent application Ser. No. 13/106,676, filed May 12, 2011, now U.S. Pat. No. 8,335,740, which is related to and claims the priority benefit of U.S. provisional patent application Ser. No. 61/333,888, filed May 12, 2010, U.S. provisional patent application Ser. No. 61/418,345, filed Nov. 30, 2010, and U.S. provisional patent application Ser. No. 61/444,567, filed Feb. 18, 2011. The contents of each of the foregoing applications are hereby incorporated by reference in their entirety into this disclosure.

FIELD

The present disclosure relates to methods and systems in the receivables management industry.

BACKGROUND

The receivables management industry deals with the collection of unpaid debt in all sectors of the economy (e.g., health care, student loans, credit cards, and retail). While some entities may try to collect their own unpaid debts, typically the delinquent accounts are turned over to a third party debt collector to manage the process of collecting the unpaid amounts. Such debt collectors employ various strategies to collect on unpaid accounts, such as making multiple phone calls to the debtor and sending a series of letters to the debtor's house. While implementation of one strategy for all debtors may be simple, it has been found that different and more tailored strategies for different types of debts are more effective and maximize returns on collection efforts. Unfortunately, such tailored strategies are costly and difficult to implement and manage.

Moreover, due to the variety of different industries and debtors that a debt collector deals with, it is difficult to determine the effectiveness of different strategies and what changes should be made to such strategies on a timely basis. As a result, some accounts become inactive and the debt collection process fails. It is also not abnormal for a debt collector to be contractually obligated to only use certain debt collection strategies for a client's account. In implementing such strategies, it is often difficult for a debt collector to ensure such obligations are being met. Without the ability to properly monitor and manage the implemented strategies, it becomes extremely difficult to determine the effectiveness of the strategies, comply with client requirements, and make improvements to such strategies.

Debt collectors understand that the effectiveness of each collection strategy depends upon obtaining debtor information (e.g., personal contact information, debtor demographic information, and the like) and being able to provide that information to their collection agents in an effective, timely manner. Such account information is obtained through a variety of sources, including the owners of the account, data service providers and the collection agents working the account. Previous collection systems had no means for determining the accuracy or relevancy of such information obtained from such sources. As a result, when a past due account is assigned to a debt collector, the collection agent working such account may have several addresses and phone numbers associated with such account with no real way of knowing which address or phone number to use to successfully contact the debtor. In the past, debt collectors have relied on their collection agents to monitor, manage, and update such debtor information through a trial and error process. As such, the effectiveness of such systems is driven by the ability of the collection agents to weed out faulty or incorrect information. Unfortunately, collection agents are often unable to effectively perform these functions in an accurate and timely manner, which has resulted in wasted effort and reduced success rates in collecting unpaid amounts.

Accordingly, there exists a need for a way to effectively and efficiently display, manage, sort through, keep track of, and verify account information of debtors for the purposes of improving collection practices.

SUMMARY

The present disclosure discloses a method, system, and computer-readable medium for managing and collecting receivables. In at least one embodiment, a method for the management and collection of receivables comprises performing collection activities with a telephone system. The method includes dialing at least two telephone numbers in a database in an attempt to contact a debtor, wherein the database includes a debtor record comprising account information and contact information associated with the debtor, the account information associated with one or more accounts of the debtor, the contact information including the at least two telephone numbers associated with the debtor. The method further includes tracking collection activity results for each of the at least two telephone numbers associated with the debtor record over a period of time, wherein the collection activity results include (i) a number of contact attempts, (ii) a number of right party calls, and (iii) times associated with each of the contact attempts and the right party calls. At a first time of day, each of the at least two telephone numbers associated with the debtor record is scored based upon the collection activity results, wherein scoring each telephone number includes (i) generating an intermediate set of first contactability scores for said telephone number, and (ii) generating a first overall contactability score for said telephone number based on said intermediate set of contactability scores. The debtor record is then inserted into a dynamic contact queue based on the first overall contactability score for one of the at least two telephone numbers associated with the debtor, the dynamic contact queue including a plurality of debtor records and associated contact information and a ranked position for each debtor record. At a second time of day immediately following the first time of day, each of the at least two telephone numbers associated with the debtor record is scored based upon the collection activity results, wherein scoring each telephone number includes (i) generating an intermediate set of second contactability scores for said telephone number, and (ii) generating a second overall contactability score for said telephone number based on said intermediate set of contactability scores. Thereafter, the method includes moving the ranked position of the debtor record to a next-to-call position in the dynamic contact queue based on the second overall contactability score. The method further includes displaying account information associated with the debtor record on a display screen based on the next-to-call position of the contact information associated with the debtor in the dynamic contact queue. The method further includes automatically calling the debtor using the telephone number associated with the second overall contactability score using an autodialer system.

In at least one embodiment a method for managing and collecting receivables includes providing at least one pre-existing account with first account information, the first account information having first account party data and providing at least one new account, each new account comprising new account information, the new account information having new account party data. The method also includes determining whether the first account party data of the pre-existing account matches the new account party data of the at least one new account and if so, tying the at least one new account with the matching pre-existing account to create a tied account. It should be noted that the tying of accounts is optional, even when a match has been made. The method further includes calculating a score for any unmatched new account and any tied account based on at least one financial parameter and determining one or more collection strategies for any unmatched new account and any tied account based on the calculated score. The method also includes applying one or more collection strategies to any unmatched new account and any tied account. The one or more strategies may then be adjusted based on comparing the cost of the strategy to potential fee income expected based on that strategy.

The computer-readable medium for managing and collecting receivables includes a computer program for managing and collecting receivables. The computer-readable medium includes code portions to perform the steps described above for the method that are stored therein.

In at least one embodiment, a system for managing and collecting receivables includes a data storage unit that stores at least one pre-existing account with first account information, the first account information having first account party data and at least one new account, each new account comprising new account information, the new account information having new account party data. The system also includes a computer system that is configured to determine whether the first account party data of the pre-existing account matches the new account party data of the at least one new account and if so, the computer system may tie the at least one new account with the matching pre-existing account to create a tied account. It should be noted that the tying of accounts is optional, even when a match has been made. Typically, the tying of accounts is conditional upon the strategy applied and also upon restrictions inherent in client contractual obligations. The computer system is also configured to calculate a score for any unmatched new account and any tied account based on at least one financial parameter, determine one or more collection strategies for any unmatched new account and any tied account based on the calculated score and/or other parameters, and apply one or more collection strategies to any unmatched new account and any tied account.

The present disclosure includes disclosure of tools and methods to monitor, manage, and update account information based around a strategy that sorts through various inputs of information regarding the debtor and scores such information so that a collection agent can determine what the best information to use is. In this manner, the system takes over control from the collection agent the process of determining and verifying what data to use. The collection agent becomes a data input instead of the primary driver of the system. Moreover, the present disclosure provides an efficient means of organizing, displaying and providing information to a collection agent so that a collection agent can have immediate and easy access to relevant and key information needed to discuss the past due account with the responsible parties on such account.

BRIEF DESCRIPTION OF THE DRAWINGS

The features and advantages of this disclosure, and the manner of attaining them, will be more apparent and better understood by reference to the accompanying drawings, wherein:

FIGS. 11-14 illustrate a graphical user interface of the Best Data tool according to at least one embodiment of the present disclosure.

FIGS. 15-19 illustrate a graphical user interface of the Margin Watch tool according to at least one embodiment of the present disclosure.

DESCRIPTION

Figure 1A:
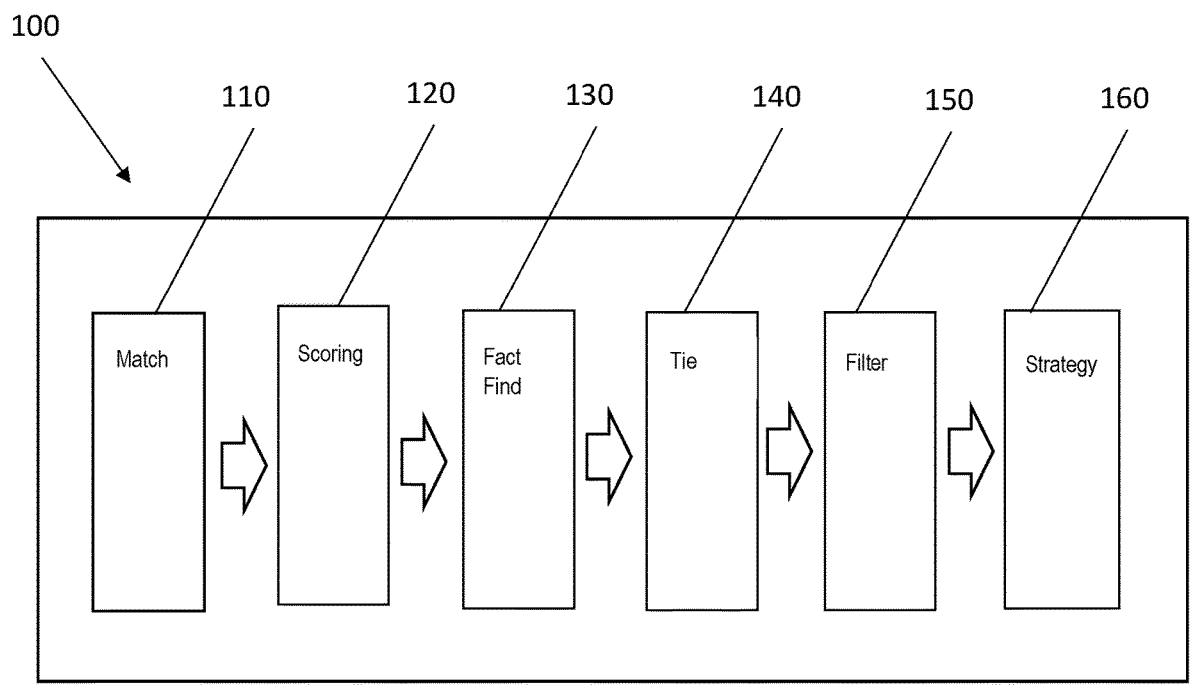
FIG. 1a shows a flowchart of a method of managing and collecting receivables according to at least one embodiment of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

The present disclosure enables executives, business managers, and others that manage debt collection to successfully implement and improve their collection strategies. The present disclosure provides debt collectors with the needed flexibility in applying collection strategies, which may lead to increased effectiveness and the prevention of accounts from being left in a state of inactivity. The present disclosure includes a method, system, and computer-readable medium for managing and collecting receivables to effectively implement collection strategies, ensure conformance with each strategy, validate the effectiveness of each strategy, and continuously improve each strategy.

Figure 1B:
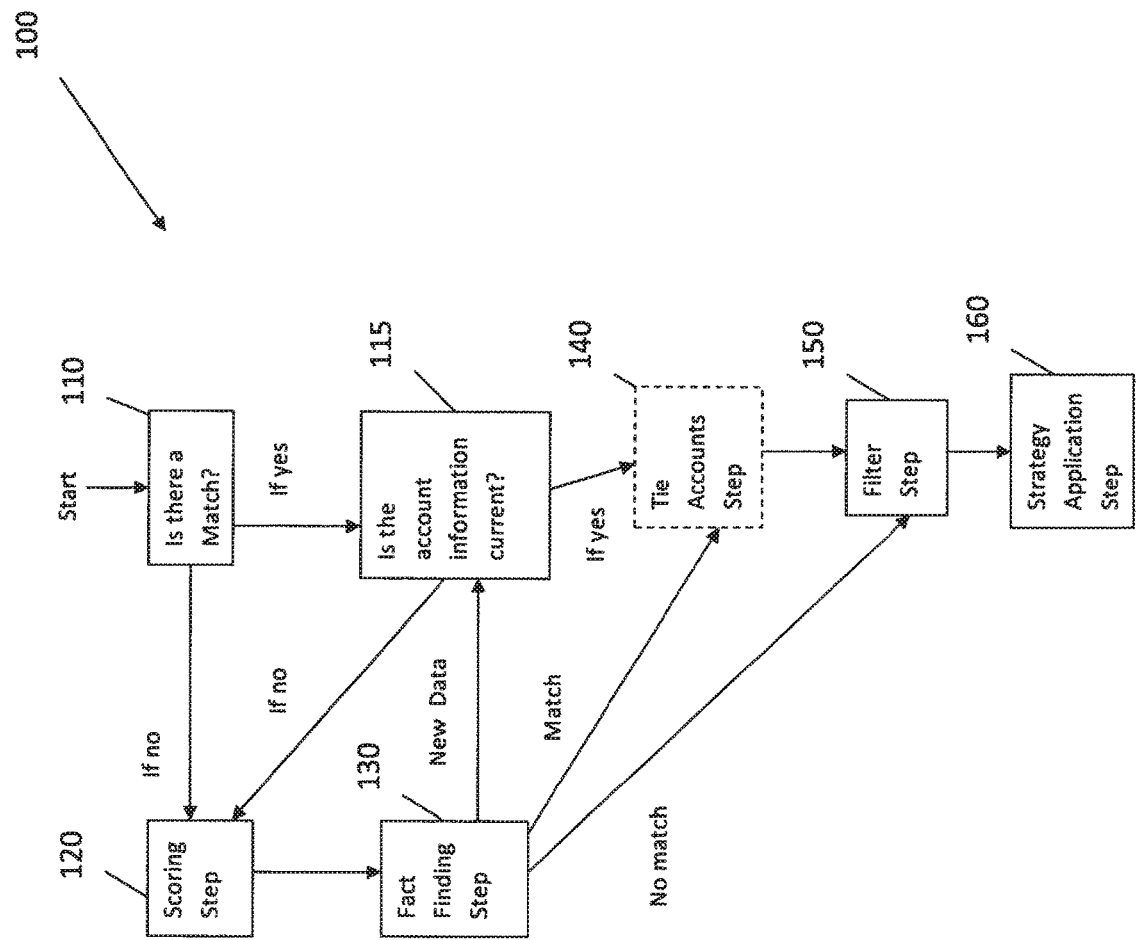
FIG. 1b shows a flowchart of a method of managing and collecting receivables according to at least one embodiment of the present disclosure.

Embodiments of a method for managing receivables are shown in FIGS. 1a and 1b. In FIGS. 1a and 1b, the method 100 begins with the Match step 110, which includes evaluating incoming accounts to determine whether or not the name on each new account ("account party") matches the name on a pre-existing account ("pre-existing account party"). Apart from the debtor's name on the accounts, the account information may include the debtor's employer's information, debtor's home address and telephone number, debtor's social security number, and the like. A match indicates that the new account party is, in fact, the same entity as the pre-existing account party. The account information may be provided to the Match step 110 in a variety of ways, such as, for example, imported from a computer network or manually entered by a user. As shown in FIG. 1b, if the account party is not identified by the Match step 110 (an unmatched account), then one or more of the subsequent steps in the method 100 may be omitted. In FIG. 1b, for example, the Tie Accounts step 140 (discussed below) may be optional if the account party is determined to not match with any pre-existing account parties.

Typically, debt collectors utilize one or more computer databases to store account information. For example, a computer database may contain, among other things, account information such as the balance on the account, the debtor's name and address, and the payment history of the debtor.

As shown in FIG. 1b, it should be noted that if a match is identified in the Match step 110 or if new data is identified in the Fact Finding step 130 (discussed below), the account information may be checked in the Optimization step 115. The Optimization step 115 may include the method of optimizing data 100c as described below or various other methods of determining how current the account information is at that time. If the account information is determined to be current in the Optimization step 115, then the next step after the Optimization step 115 may be the Tie Accounts step 140 or may be directly to the Filter step 150. As shown in FIG. 1b, if the account information is determined not to be current in the Optimization step 115, then the next step after the Optimization step 115 may be the Scoring step 120 (discussed below).

As shown in FIGS. 1a and 1n FIG. 1b (assuming there is no match in Match step 110), the next step in this embodiment of method 100 may be the Scoring step 120. The Scoring step 120 includes a scoring model that is used to calculate a collectability score for each account party. For example, the scoring model may determine that an account party that has recently gone through bankruptcy has a low collectability score (e.g., two), while an account party that has only missed a few payments and never gone through bankruptcy may have a relatively high collectability score (e.g., seven). While any type of financial parameters can be used to determine a collectability score, some typical examples of parameters used in scoring models include, but are not limited to, delinquency history (number of times delinquent, maximum delinquency days, most recent delinquency date), total assets of the account party, bankruptcy, fraud, and employment information.

As shown in FIGS. 1a and 1b, the next step in this embodiment of method 100 may be the Fact Finding step 130. In general, the Fact Finding step 130 may involve purchasing data (e.g. credit reports or updated contact information) to assist in the collection effort. The Fact Finding step 130 may also include verifying the information provided by the account party (e.g., bankruptcy verification). The Fact Finding step 130 may allow for such verification and collection of data through the use of independent data vendors' services. In this embodiment, method 100 permits the debt collector to electronically access such services through the internet. As shown in FIG. 1b, the Fact Finding step 130 may be bypassed if the Match step 110 identifies the account party as a pre-existing account party because the pre-existing account may already have all the needed information. As shown in FIG. 1b, if the Fact Finding step 130 obtains new information, the new information may be checked to determine how current it is via the Optimization step 115.

The collectability score calculated in the Scoring Step 120 can be used to determine how much effort (and cost) is expended in the Fact Finding step 130 for a particular account. As would be expected, the Fact Finding step 130 may be more extensive (and generally more expensive) for accounts with higher outstanding balances. For example, when an account party has a high account balance and a high collectability score, the debt collector may set-up the Fact Finding step 130 to perform a rigorous (and more expensive) review of the account information and account party. On the other hand, the Fact Finding step 130 may be less extensive and rigorous if the account has a relatively low collectability score and/or lower outstanding account balance.

Figure 1C:
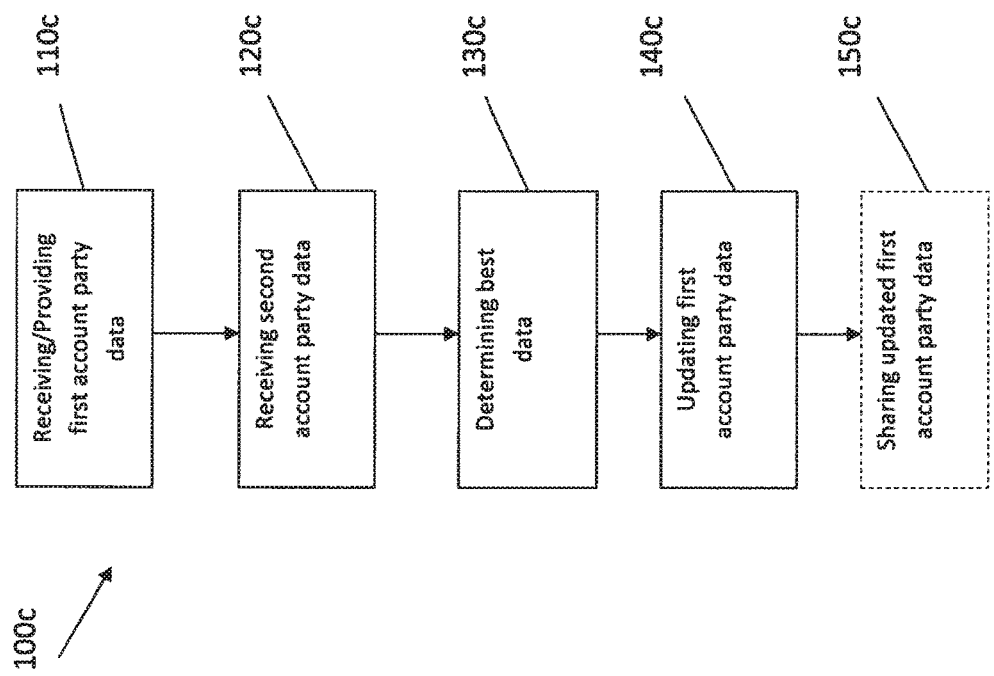
FIG. 1c shows a flowchart of a method of optimizing data according to at least one embodiment of the present disclosure.

The Fact Finding step 130 may also provide debt collectors with the needed capability of efficiently managing and updating personal information of debtors so as to enhance their effectiveness in collection and the prevention of accounts from being left in a state of inactivity. For instance, the Fact Finding step 130 may include a method of optimizing data 100c as shown in FIG. 1c. In FIG. 1c, the method 100c begins with the step of receiving or providing first account party data 110c. It should be noted that the method 100c for optimizing data of the present disclosure may be used on its own or along with or to complement one or more programs. Of course, if the method 100c is part of method 100, then the step of receiving data 110c in method 100c may simply be or be part of the Match step 110. The account party data may include information about the debtor, including, but not limited to, demographics, place of employment, assets, and attorney.

The source of the first account party data in step 110c may typically be an original creditor, data services vendors, and collection and attorney firms to which a receivables management firm outsources work. In addition, the source of the first account party data may be another entity or may be inputted manually by the debt collector who may have the information from the debtor or another entity. It should be noted that, as described below, the first account party data may not necessarily be the original account party data from a creditor or the like. As will be understood from the discussion below, the first account party data may include the best data from a previous iteration of method 100c.

As shown in FIG. 1c, the next step in method 100c may be receiving second account party data 120c. The source of the second account party data in step 120c may be from one or more sources, including, but not limited to, a user with direct access to the account information (e.g., a user of Ontario Systems, LLC's CONNECT SAVVY® system), the source of the first account party data, a collection or attorney vendor, or a data services vendor (e.g., a vendor of Ontario Systems, LLC's CONNECT SAVVY® network).

As shown in FIG. 1c, the next step in method 100c may be determining the best data from the first and second account party data 130c. Best data refers to account party data that is determined to be the most current relative to the other account party information being considered for collection purposes. The best data from the first and second account party data may be determined by comparing the source of each of the first and second account party data and the age of the first and second data. For instance, best data may be based on whichever data is newer, the ranking of sources (e.g., source A is considered to have more trustworthy data over source B), the completeness of the data received, or a combination of such rules. For example, step 130c may include comparing the age of the place of employment information for the first account party data against the age of the place of employment information for the second account party data. The rules determining the best data may be created manually, imported from another entity, codified within the system, or the like.

The ranking of sources for best data purposes may typically be based on the quality of the sources. As an example, the ranking of the sources from best to worst quality may be a user of Ontario Systems, LLC's COLLECT SAVVY® system, a vendor of Ontario Systems, LLC's CONNECT SAVVY® network, a vendor (e.g., attorney or agency) to whom the account was forwarded, migrated data, and an update from the original source. In one example, if the first account party data has existed more than a predetermined amount of time (e.g., 180 days), step 130e may bypass any consideration of the quality of the sources and determine that the second account party data is the best data. It should be noted that if the first and second account party data are the same, the best data will simply be the first account party data.

As shown in FIG. 1c, the next step in method 100e may be applying the determined best data to the current account party data 140c, which may include updating the current account party data with the determined best data. For example, the residential address for an account party (John Smith) may be currently saved in a computer database as Address A. As account party data for John Smith is received from various sources in step 120c, the best data out of the account party data from the various sources is determined in step 130c. If the best data includes a residential address of Address B, then the computer database may be updated in step 140c by replacing Address A with Address B in the current account party data. Of course, if the incoming best data already exists in the computer database as the current account party data, then the account party data may not be updated.

As shown in FIG. 1c, the next step in method 100c may optionally be sharing the current account party data 150c, which may include sending current account party data to various clients. For example, once a month, every day, or upon the occurrence of every update, the account party data for one or more clients may be updated from the entity that determines best data. The various clients that receive updates to account party data may sign up via contracts, opt-in provisions, or other mechanisms. In some cases, the step of sharing the account party data 150c will be excluded from the system because an agreement between two parties (e.g., contractual restrictions), a law governing the relationship between two entities (e.g., privacy regulations), and the like may limit the use and sharing of personal and identifying information. For instance, privacy laws (e.g., Health Insurance Portability and Accountability Act) may limit the updated information that can be shared with others. The result is that some parties or entities may not be able to receive the best data for a given account party.

It should be noted that the method 100c described above may be used for a single account or across several accounts for the same account party. For instance, the method 100c may consider the account party data for several accounts relating to the same party and provide each of the accounts with the best data for the account party from the analysis of all accounts.

Typically, each of the steps described above for method 100c automatically processes incoming account information, although one or more of the steps may not be automatic or automated. This automation eliminates the human error of accidentally disregarding incoming account information, failing to properly select the best data, or following inefficient methods of determining the best data. As described below, the method 100c may be implemented into a computer-readable medium and be carried out with the aid of a computer.

As shown in FIGS. 1a and 1b, the next step in this embodiment of method 100 may optionally be the Tie Accounts step 140. The Tie Accounts step 140 includes grouping accounts together (such that they are "tied" together) by using the information obtained in the Match step 110, Scoring step 120, and/or Fact Finding step 130. The Tie Accounts step 140 utilizes tie options (or rules) to determine how and when accounts are tied together. For example, if the debt collector chooses, the accounts could be tied together only when all the responsible parties on the accounts are the same (e.g., the debtors are all the same on each account) or when any one responsible party is common throughout all of an account group (e.g., the debtor is the same but a different co-signor is listed on different accounts). Tied accounts generally have a better chance of being collected on because the debt collector can tailor the strategy (or combine multiple strategies into one strategy) for collection in view of the other accounts. Tied accounts also provide a greater return on investment for the debt collector because the debt collector is able to use a single action (e.g. one phone call) to collect on multiple accounts. The Tie Accounts step 140 may be bypassed if the Match step 110 is unable to find a matching account party. It should be noted that the tying of accounts is optional, even when a match has been made. Typically, the tying of accounts is conditional upon the strategy applied and also upon restrictions inherent in client contractual obligations.

As shown in FIGS. 1a and 1b, the next step in this embodiment of method 100 may be the Filter Accounts step 150. The Filter Accounts step 150 includes grouping/segmenting accounts and assigning collection strategies to such grouped/segmented accounts. The Filter Accounts step 150 may use the information obtained from one or more of the Match step 110, Scoring step 120, and/or Fact Finding step 130 to determine the most appropriate collection strategy for the grouped accounts. For example, grouped accounts with a high collectability score and a high balance may have a more aggressive collection strategy than grouped accounts with a low balance and low score. Each grouped account gets assigned a strategy which defines the collection approach to be taken on that account from inception to inactivation. In another example, the new data determined by the Fact Finding step 130 may cause a particular collection strategy based on, for example, demographics such as the city or state or the presence of bankruptcy information or assets or attorney.

In both scoring and grouping the accounts, the method 100 may rely on pre-defined standardized parameters provided by a vendor, such as Ontario Systems, LLC or on customized parameters set by the user of the method. For example, a debt collector may contractually agree that the accounts of one of its large clients may only be subject to particular collection strategies. As such, the Filter Accounts step 150 can be set by the debt collector only to select those permitted strategies for delinquent accounts provided by that client. After assigning such specialized accounts controlled by contract or the like to their strategies, the Filter Accounts step 150 may then segment the remaining accounts into the strategies it determines will provide the best return on investment.

The Filter Accounts step 150 may also include defining multiple competing collection strategies and diverting accounts by, for example, number of accounts or account balance from a champion strategy (which may be described as a strategy that is typically or has been recently employed for such accounts) to a challenger strategy (which may be described as a strategy different from what is typically or recently employed for such accounts). The Filter Accounts step 150 may use the account data obtained from the Match step 110, Scoring step 120, and/or Fact Finding step 130 to determine how to segment such accounts. Once the accounts have been segmented, a percentage of the segmented accounts may be assigned to the challenger strategy while the remainder of the accounts are provided to the champion strategy. The accounts are chosen at random from the segment to preserve the integrity of the challenger strategy experiment.

As shown in FIG. 1, the next step in this embodiment of method 100 may be the Strategy Application step 160. Generally, the Strategy Application step 160 includes implementing the strategies selected for the accounts in the Filter Accounts step 150. The Strategy Application step 160 may also include tracking settings, configurations, and other data regarding accounts and collection strategies. In this regard, the Strategy Application step 160 may include recording the cost of work activity on a per account basis and reacting once that cost approaches, meets, or exceeds a predetermined percentage of the desired potential fees to be earned on that account. Through such activity, the Strategy Application step 160 may provide a way to effectively lower the cost of recovery while ensuring that a debt collector's resources are applied to accounts that present the highest potential margin of recovery.

Figure 1D:
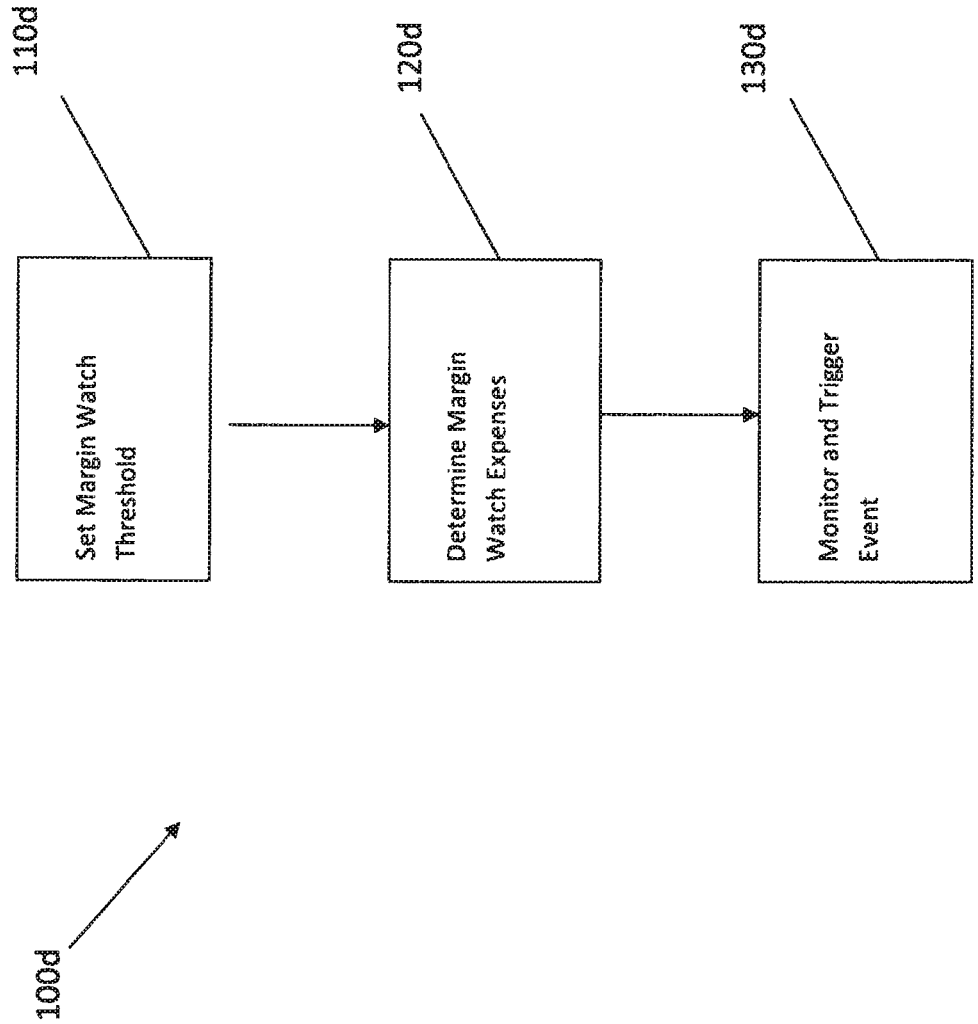
FIG. 1d shows a flowchart of a method of monitoring profit margins of accounts according to at least one embodiment of the present disclosure.

One embodiment of such a method for monitoring profit margins of accounts is shown in FIG. 1d. In FIG. 1d, the method 100d begins with the Margin Watch Threshold step 110d, which includes selecting a desired percentage of the potential fee for recovery of one or more accounts. The resultant fee amount (i.e., the desired percentage multiplied by the potential fee) is hereinafter called the Margin Watch Threshold. The Margin Watch Threshold step 110d may additionally include configuring various others collection features. For example, the debt collector may choose acceptable strategies for collection on certain accounts. It should also be noted that pre-defined standardized parameters provided by a vendor, such as Ontario Systems, LLC, may be implemented such that a debt collector would not be required to choose such features. It should be noted that the method for monitoring profit margins of accounts may not be invoked until or unless expenses are accumulated.

As shown in FIG. 1d, the next step in method 100d is the Margin Watch Expenses step 120d, which includes tracking the cost of recovery efforts ("Margin Watch Expenses") on each account. The Margin Watch Expenses step 120d includes collecting the costs of labor (e.g., the salary paid to an account representative working an account), making telephone calls, letters (e.g., the cost of an in-house letter that includes postage and printing costs), commission, and various other costs of recovery, such as costs associated with data products and services from vendors (e.g., CONNECT SAVVY® services).

The Margin Watch Expenses step 120d may calculate Margin Watch Expenses based on when and the amount of time that an account representative (or other user) works an account, the hourly rate or salary of the representative (or other user), data service that a user requests on an account (e.g., a type of CONNECT SAVVY® service), as well as various other cost factors encountered in collection activity.

Figure 1E:
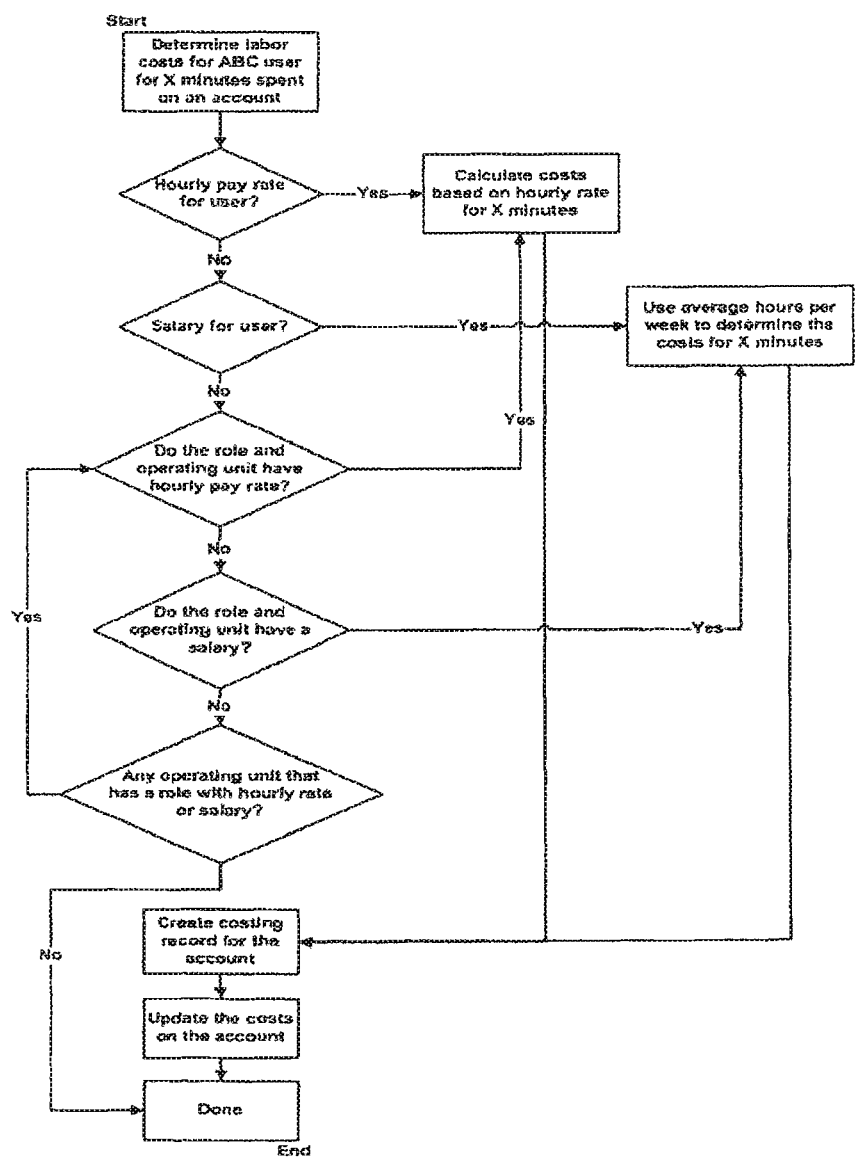
FIG. 1e shows a flowchart of a method of monitoring profit margins of accounts according to at least one embodiment of the present disclosure.
Figure 1F:
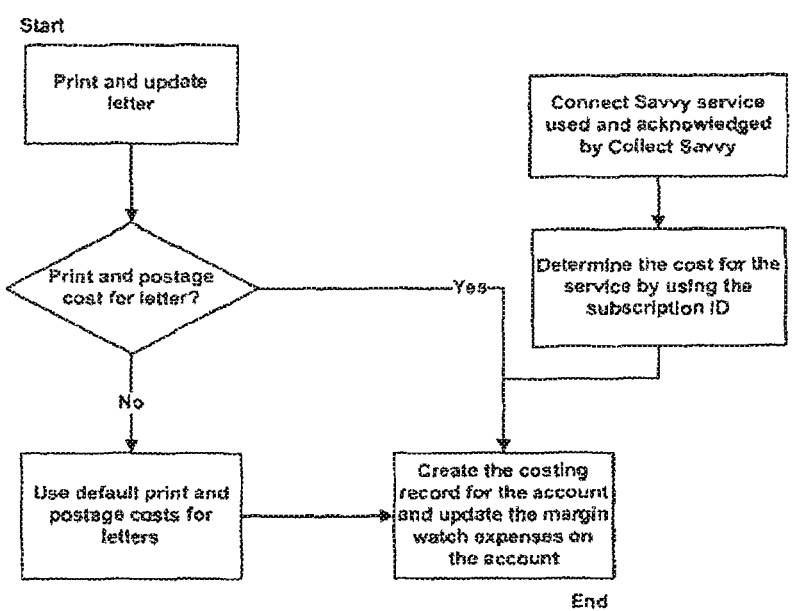
FIG. 1f shows a flowchart of a method of monitoring profit margins of accounts according to at least one embodiment of the present disclosure.

Of course, in order to calculate Margin Watch Expenses, a cost must be attributed to various activities. In some cases, the costs are readily available, such as, for example, the cost of a stamp. The cost of other activities may need to be approximated by the debt collector. For instance, the debt collector may need to set system-wide costs on an internal business unit, costs for printing and mailing a letter, costs for telephone calls, and costs for other activities relating to a collection strategy. It should be noted that the costs of various services (e.g., CONNECT SAVVY®) may be determined from subscription tables. FIG. 1e illustrates how expenses for labor may be calculated for the Margin Watch Expenses step 120d. FIG. 1f illustrates how expenses for letters and services may be calculated for the Margin Watch Expenses step 120d. In FIG. 1f, the services are for CONNECT SAVVY®.

When an account in a tied account group incurs Margin Watch Expenses, the costs are typically dispersed evenly across all accounts in the tied account group. For example, suppose a tied account group contains account 1, account 2, and account 3. If account 1 incurs an expense of $30, $10 is added to the balance of the costs for each account. Alternatively, the costs may be dispersed according to a predetermined set of rules.

The Margin Watch Expenses step 120d may also include creating a record of costs, such as labor costs, at various times and recording total Margin Watch Expenses for particular accounts at various times.

As shown in FIG. 1d, the next step in method 100d is the Monitoring and Triggering Event step 130d, which includes monitoring the Margin Watch Expenses and comparing the Margin Watch Expenses with the Margin Watch Threshold for one or more accounts. When Margin Watch Expenses approach, meet, or exceed the Margin Watch Threshold on an account (an "Event"), the Monitoring and Triggering Event step 130d may perform predetermined actions. Typically, the actions performed at the occurrence of an Event are directed to mitigating additional Margin Watch Expenses, such as by limiting or adjusting collection activities or stopping work on the account altogether. Instead of following predetermined actions at the occurrence of an Event, it should be noted that the Monitoring and Event step 130d may prompt users to reconfigure collection strategies to maximize return on collection activities. The Monitoring and Event step 130d may also include producing a report at specified times or intervals or at the direction of a user to identify accounts that have exceeded their particular Margin Watch Threshold.

Each of the steps described above for method 100d may be automated, although one or more of the steps may not be automatic or automated, such as, for example, the Margin Watch Threshold step 110d. The automation of the steps eliminates the human error of accidentally failing to monitor the expenses incurred on an account and/or following an inefficient or wasteful collection strategy. As described below, the method 100d may be implemented into a computer-readable storage medium and be carried out with the aid of a computer.

The Strategy Application step 160 may include analyzing the history and effectiveness of collection strategies. Such analysis can include allowing the debt collector to run reports on a near-real time basis to demonstrate the effectiveness of the strategies being employed for a group of accounts. For example, the champion and challenger strategies may be compared to determine which is most efficient and profitable. Based upon this comparison of such champion and challenger strategies, collection strategies themselves may be improved and collection efforts of collection managers may benefit by knowing which strategies are effective for particular accounts. By knowing which of (or what aspects of) the champion or challenger strategies are successful (such as by analyzing various phases and cycles, discussed below), a hybrid strategy may be created by adopting the best aspects of each of the collection strategies.

The Strategy Application step 160 may also break-up the processing of an account into phases. For example, a first phase may be a Pre Collect phase which may be followed by a Collections phase. Each phase may be further divided into cycles. Each cycle comprises the actions and order of actions that are taken for accounts. Cycles may be activity or time-based. For example, an activity-based cycle may involve a one-time personal visit to the debtor's home. Another example might be a review of a debtor's employment situation to prepare a request for wage garnishment.

A time-based cycle may be, for example, sending letters to the debtor's home twice a month for six months. Each action may be executed conditionally. For example, an action may be repeated because a precondition has not been satisfied, such as there being no response from the debtor in view of phone calls to debtor's phone. The actions may also be grouped together into programs to effortlessly utilize the same pattern of actions in multiple phases in the strategy. For example, the programs may include repeated calling or multiple letters or emails.

The Strategy Application step 160 also includes the ability to react to special circumstances by taking additional and/or alternate paths. Alternate paths to the collection workflow are described as stages. Accounts are typically moved into stages as a response to an event. For example, the debt collector may have obtained a payment arrangement for an account. The account would then be moved into a stage which would monitor the progress of the payment arrangement rather than continuing with the normal collection activity as specified by the phase cycle. When an account is moved into a stage, the activity specified by the phase cycle is paused. Once the stage has completed, the cycle is resumed unless the exit criteria for the cycle has already been met (e.g., payment has been received). Therefore, the Strategy Application step 160 monitors phases and cycles to track an account's progress in the collection process and further maximizes collection recovery.

It should be noted that a method comprising each of the Matching step 110, Filter step 150, and Strategy Application step 160 may comprise one embodiment of the present disclosure. That is, the Scoring step 120, Fact Finding step 130, and Tie Accounts step 140 may be optional in view of the outcome of the Matching step 110.

Typically, each of the steps described above for method 100 automatically advance accounts through the collection process, although one or more of the steps may not be automatic or automated. This automation eliminates the human error of accidentally omitting accounts from being worked, failing to comply with client requirement, and/or following an inefficient collection strategy. In particular, the Filter step 150 and Strategy Application step 160 may be automatically executed such that strategies are implemented and improved efficiently and quickly. As described below, the method 100 may be implemented into a computer-readable medium and be carried out with the aid of a computer.

A computer-readable medium, such as a non-volatile storage medium, may comprise the steps of the methods for managing receivables described herein. For instance, the methods may be incorporated into a computer program to automatically monitor the accounts of debtors, automatically determine what collection strategy should be applied to a particular account, automatically apply the selected strategy to the particular account, and automatically monitor, manage, and update account information. The computer program may be generated in any software language or framework such as C#, COBOL, C++, Microsoft® .NET Framework or the like.

The computer-readable medium for performing the embodiments of the present disclosure may include computer-readable program code portions, such as a series of computer instructions, embodied in the computer-readable medium. It should be understood that the computer-readable program code portions may include separate executable portions for performing distinct functions to accomplish embodiments of the present disclosure. Additionally, or alternatively, one or more of the computer-readable program portions may include one or more executable portions for performing more than one function to thereby accomplish embodiments of the process of the present disclosure.

In conjunction with the computer-readable medium, a computer that includes a processor, such as a programmable-variety processor responsive to software instructions, a hardwired state machine, or a combination of these may be used to carryout the method disclosed above. Such computers may also include memory, which in conjunction with the processor is used to process data and store information. Such memory can include one or more types of solid state memory, magnetic memory, or optical memory, just to name a few. By way of non-limiting example, the memory can include solid state electronic random access memory (RAM); sequential access memory (SAM), such as first-in, first-out (FIFO) variety or last-in, first-out (LIFO) variety; programmable read only memory (PROM); electronically programmable read only memory (EPROM); or electronically erasable programmable read only memory (EEPROM); an optical disc memory (such as a DVD or CD-ROM); a magnetically encoded hard disc, floppy disc, tape, or cartridge media; or a combination of these memory types. In addition, the memory may be volatile, non-volatile, or a hybrid combination of volatile and non-volatile varieties. The memory may include removable memory, such as, for example, memory in the form of a non-volatile electronic memory unit; an optical memory disk (such as a DVD or CD ROM); a magnetically encoded hard disk, floppy disk, tape, or cartridge media; or a combination of these or other removable memory types.

The computers described above may also include a display upon which information may be displayed in a manner perceptible to the user, such as, for example, a computer monitor, cathode ray tube, liquid crystal display, light emitting diode display, touchpad or touchscreen display, and/or other means known in the art for emitting a visually perceptible output. Such computers may also include one or more data entry, such as, for example, a keyboard, keypad, pointing device, mouse, touchpad, touchscreen, microphone, and/or other data entry means known in the art. Each computer also may comprise an audio display means such as one or more loudspeakers and/or other means known in the art for emitting an audibly perceptible output.

One or more such computers may be configured to be a server. Such a server need not, however, be a single server. A server according to the present disclosure may comprise a plurality of servers or other computing devices or systems connected by hardware and software that collectively are operable to perform the computing functions according to the present disclosure. In at least one embodiment, such a server may be operable to be a web server, configured and programmed to carry out the computing functions according to the present disclosure.

In at least one embodiment of the present disclosure, a database resides on such a server and stores information and data utilized in the course of the present disclosure. For example, information about accounts that are pending or may be pending in the future is stored in the database; information about a collection strategy should be applied to a particular account; information for applying a selected strategy to a particular account, information for generating the graphical user interfaces disclosed herein is stored in the database; information for monitoring, managing, and updating account information; and information about users of systems according to the present disclosure, such as collection agents, is stored in the database. In at least one embodiment of the present disclosure, such a database resides on a computing device remote from the server, provided the remote computing device is capable of bi-directional electronic communication with the server. Preferably, the remote computing device upon which the database resides may be electronically connected to the server such that the remote computing device is in continuous bi-directional communication with the server. It will be appreciated that such database may comprise a plurality of databases connected by software that collectively are operable to perform the functions according to the present disclosure.

The following discussion relating to FIGS. 2-10 describes an example of a computer-readable medium that comprises the steps of the method 100 described above. The computer program described in FIGS. 2-10 is referred to herein as the Strategy Commander tool. FIGS. 2-10 show graphical user interfaces of the Strategy Commander tool for various steps of the method 100 described above. The Strategy Commander tool provides a centralized configuration and visualization area for receivables management processes. It includes a completely automated and controlled execution of the collection strategy with both proactive and reactive processing. The Strategy Commander tool automates collection processes, configuration, and visualization in order to incorporate business or collection intelligence to prove or determine the most successful business strategies.

The Strategy Commander tool may be based on any development platform, such as Microsoft® Silverlight® application. While the Microsoft® Silverlight® application is used, any other number of development platforms may be used. As noted above, the Strategy Commander tool incorporates business or collection intelligence to provide a user with a rich, context-aware interface for defining, maintaining, and evaluating the collection strategies and all collection configurations. It uses visualization techniques to make strategy process flow simple to understand. As described below, the Strategy Commander tool may include the ability to drag and drop phases and the like, allowing easy alteration of the collection process flow. It also may offer option-based detail definition to both provide overall clarity and full transparency to the details. For example, in the definition of a phase cycle, the user can optionally specify exit criteria such as number of days in the phase which allow further control over the process flow.

The Strategy Commander tool generally allows business executives and others that manage receivables to define their desired collection processes without the need for an IT administrator by providing a user-friendly application and automating many of the steps of operation. It maximizes efficiency of operations through a proactive approach to collection process automation, a seamless transition between automated and manual processes, and reaction to outside influences. This combination of approaches allows overall collection strategy definition while providing the necessary flexibility for individual account circumstances. It also incorporates visualization of the collection processes and centralizes configuration in a single area to improve comprehension of the complex collection processes. As noted herein, the Strategy Commander tool includes the ability to define multiple competing debt collection strategies and use business or collection intelligence obtained by monitoring such processes to compare them and definitively prove one (or aspects of one or each) to be superior in profit maximization.

Figure 2:
FIGS. 2-10 illustrate a graphical user interface of the Strategy Commander tool according to at least one embodiment of the present disclosure.

As shown in FIG. 2, the Strategy Commander tool may keep track of a variety of lines of business. For example, the screen shot in FIG. 2 displays 3 separate lines of business—credit card, medical self-pay, and retail. The lines of business may include multiple accounts and are each part of the inventory for the Enterprise portion of the debt collector that is utilizing the Strategy Commander tool. For each line of business, inventory statistics for that particular line of business may be displayed. For example, in FIG. 2, for the Credit Card line of business, the inventory statistics include pie charts showing what percentage of accounts are in the Strategy Application step 160 and what accounts are in the Fact Finding step 130. Among other information, the inventory statistics may also include data about how much is being managed for that line of business.

Figure 3:
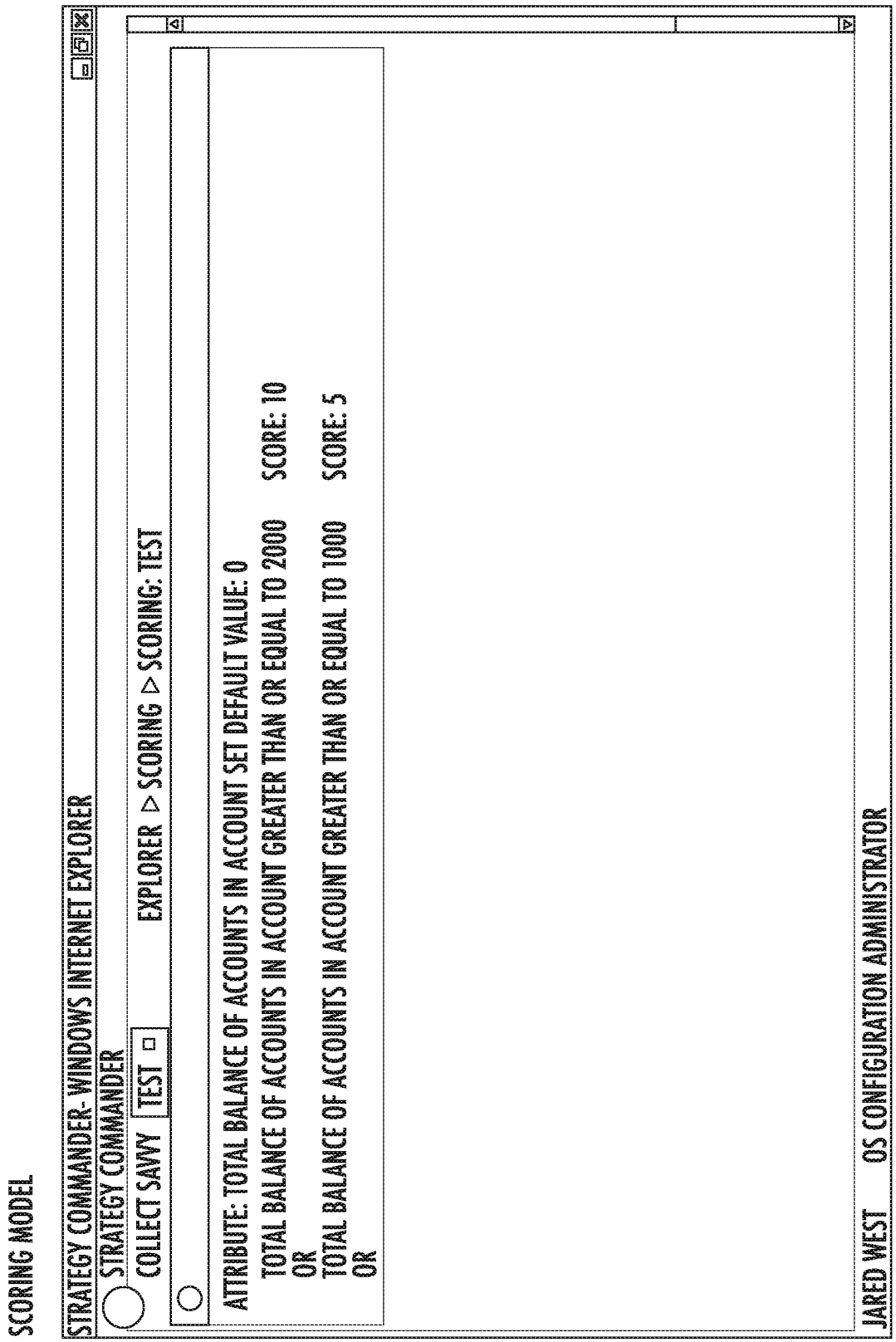

FIG. 3 shows a graphical user interface displaying results of the Scoring step 120, which was described above. As shown in FIG. 3, the account balance in this embodiment is used to determine the score for each account. As shown in FIG. 3, if the total balance of accounts is greater than or equal to two thousand dollars, then the score is ten. As described above, other account information may determine or contribute to the score for each account.

Figure 4:
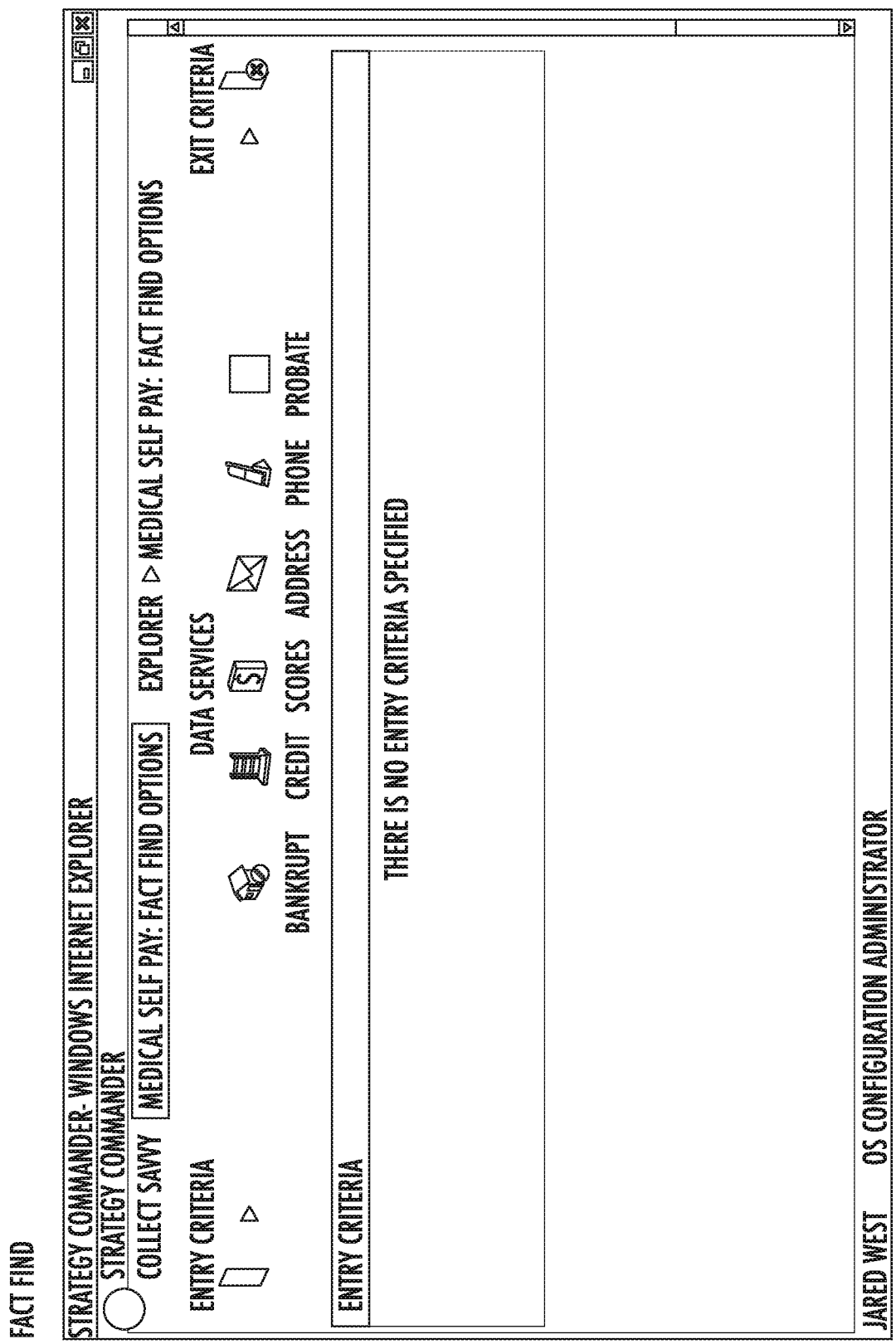

FIG. 4 shows a graphical user interface displaying the options available for the Fact Finding step 130. In this example, the options include services to check for bankruptcy, debtor's credit including the score, debtor's address and telephone numbers, and probate issues. As noted above, these services are typically provided by third parties or automatically accessed by the tool. However, in other embodiments, this information or service may be obtained or performed manually by a user of the Strategy Commander tool.

Figure 5A:
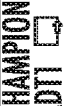
Figure 5B:
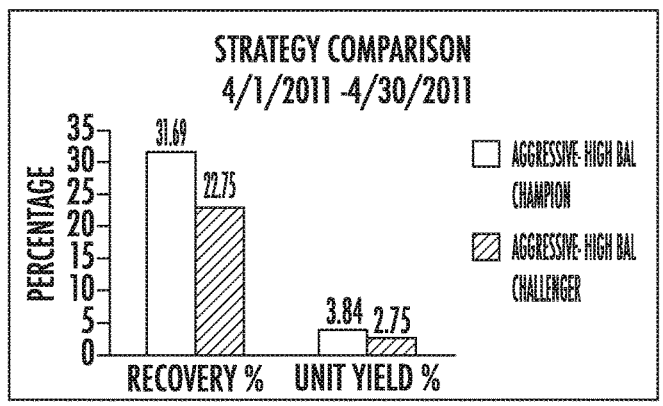

FIG. 5a shows a graphical user interface displaying the number and aggregated balance of accounts being managed by the champion and challenger strategies. As noted above, champion and challenger represent different strategies that can be compared to determine what strategy is best for collecting money from a particular group of accounts or type of debt. FIG. 5b shows a comparison of the results of the champion and challenger strategies. The results for the champion and challenger strategies shown in FIG. 5b may provide a user with valuable insight into what strategy is working. The Strategy Commander tool may also use this information to automatically improve the collection process by, for example, favoring the strategy with the better results and applying that strategy to more accounts.

Figure 6A:
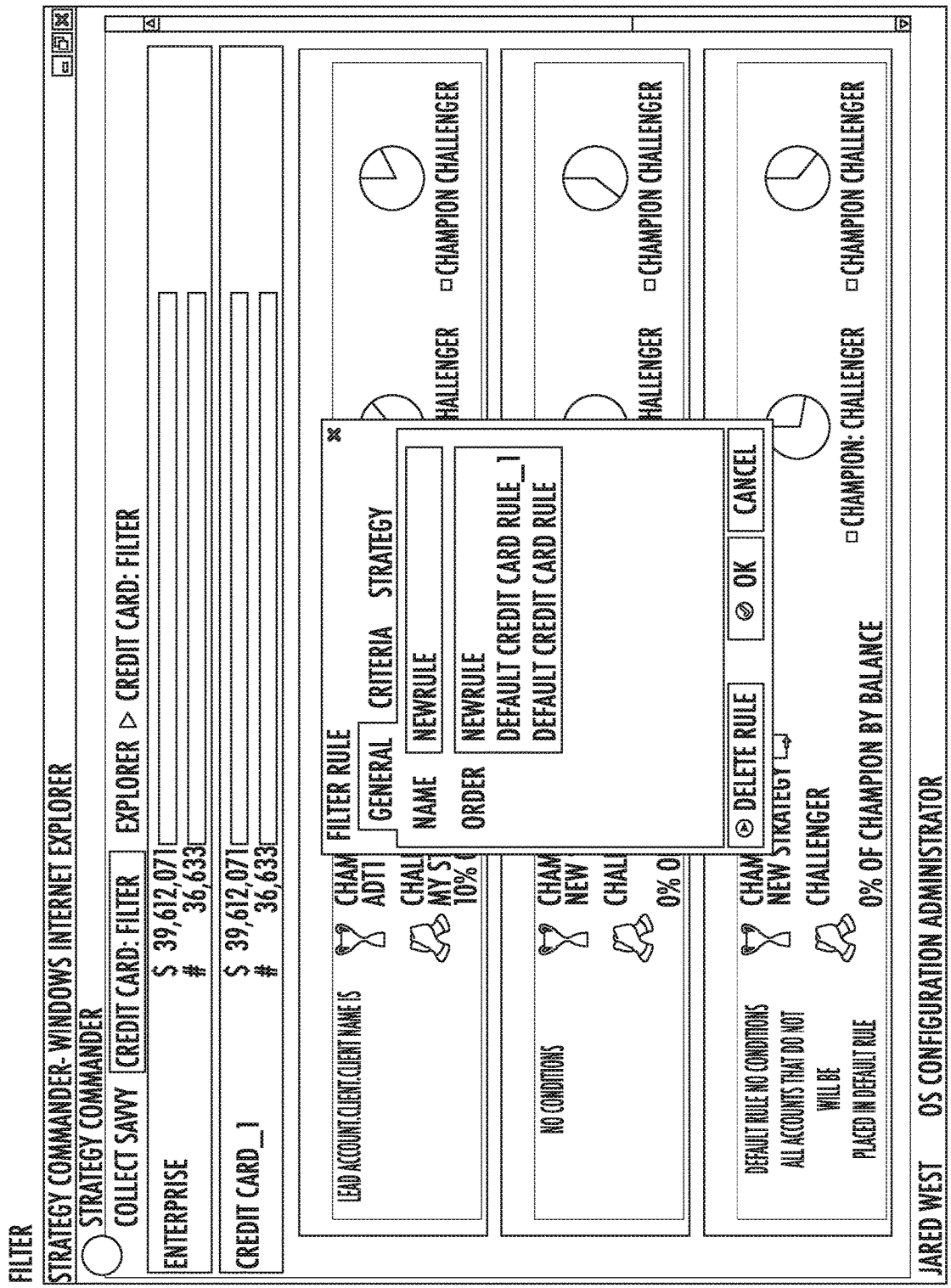
Figure 6B:
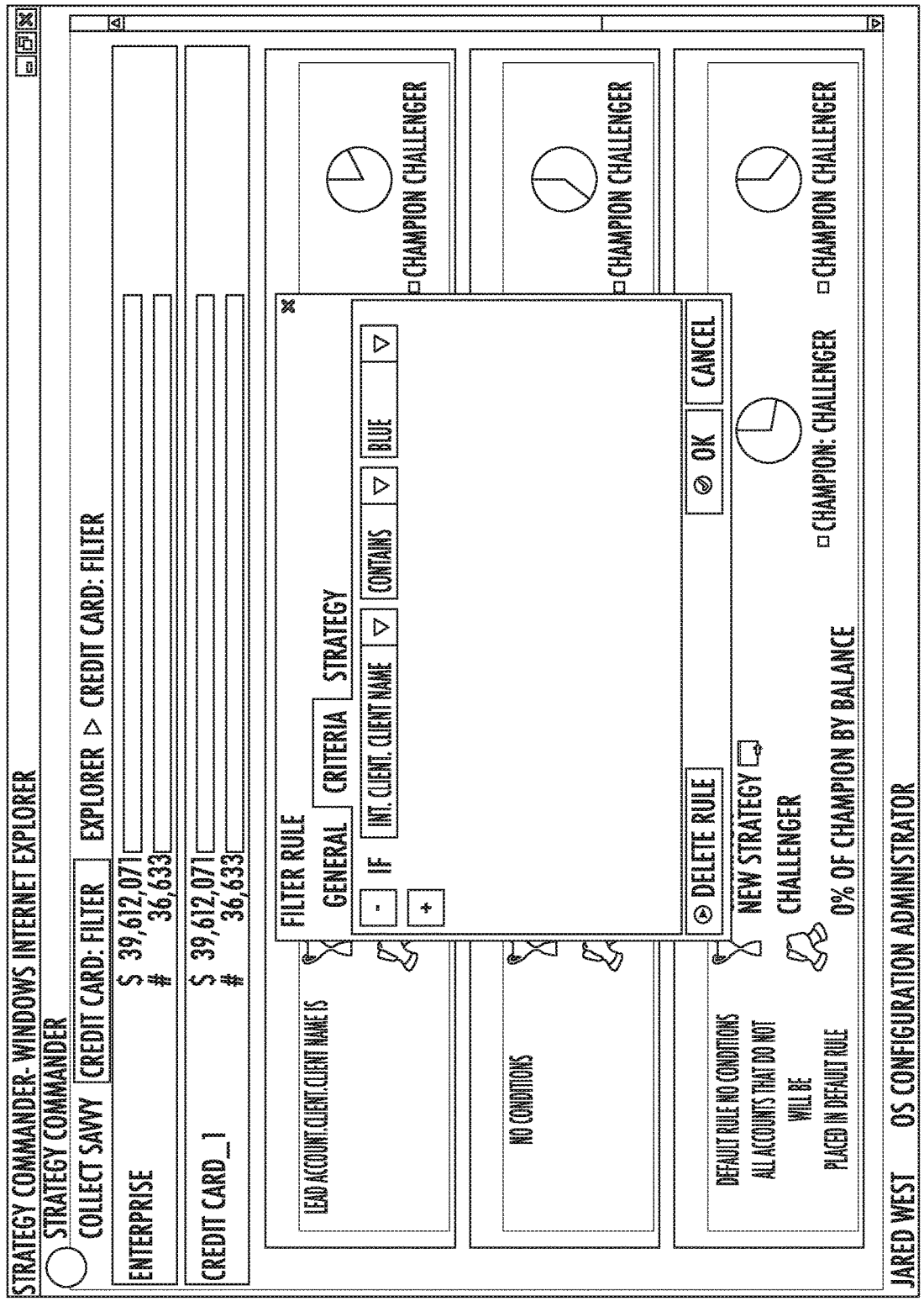

FIG. 6a shows a graphical user interface of the Filter step 150 where the rules that govern the Filter step 150 are selected and ordered. The rules may be put in a particular order by dragging and dropping each order in the desired place. FIG. 6b shows a graphical user interface of the Filter step 150 where the rules selected and ordered in FIG. 6a may be set up with various criteria for identification and operation. FIG. 6c shows a graphical user interface of the Filter step 150 where the strategy for each of the champion and challenger may be selected. As noted previously, the tool may select the appropriate strategies automatically based upon various factors, such as collectability score and the like. In addition, FIG. 6c shows that the user may choose the percent of accounts to be segmented from the Champion strategy and placed under the Challenger strategy. The selection of the percent of accounts may also be done automatically by the tool.

Figure 7:
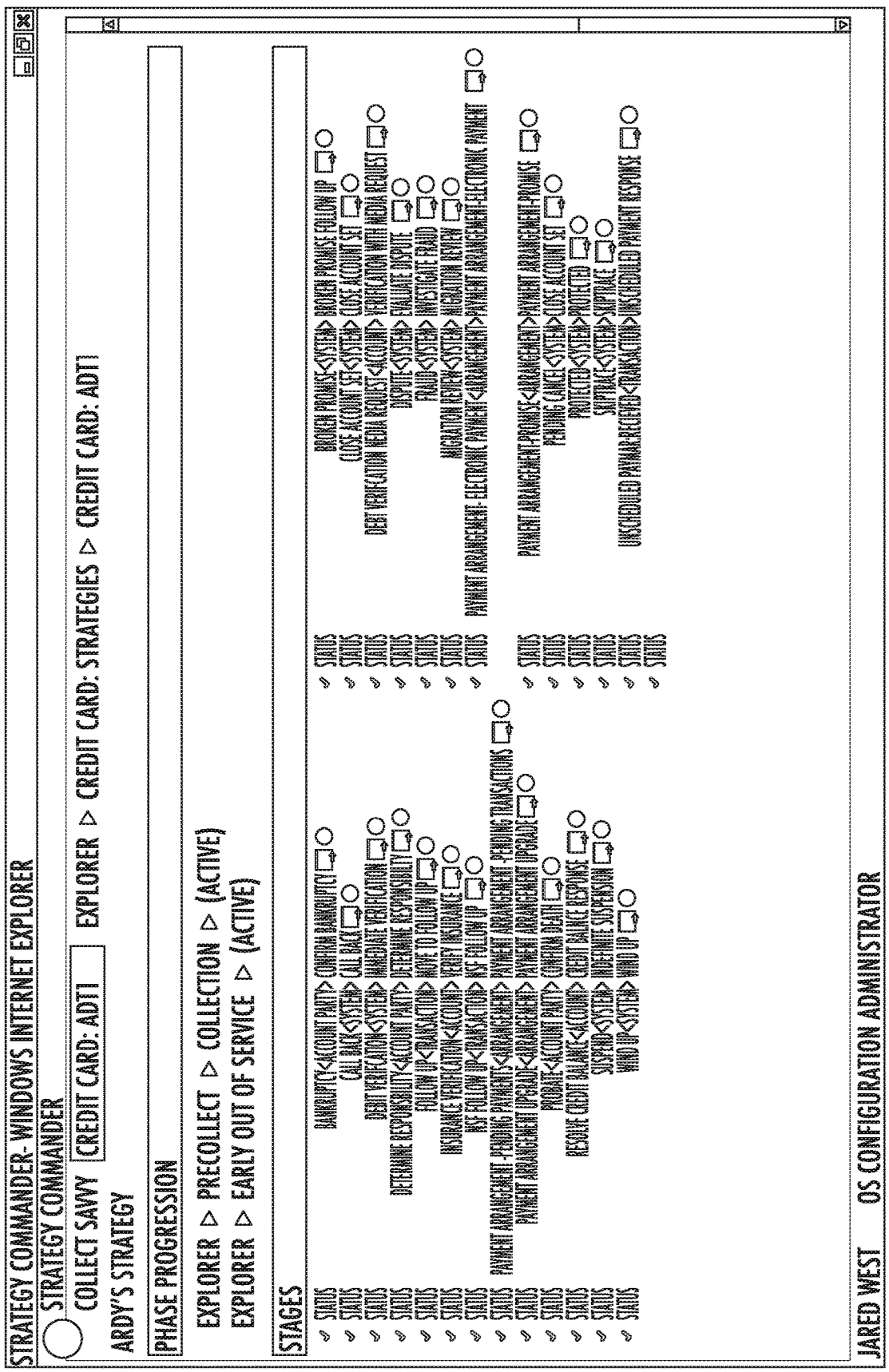

FIG. 7 shows a graphical user interface for a line of business (Credit Card) including the phase progression and the stages for "ADT1: Andy's strategy." As shown in FIG. 7, the phase progression may include visualizations of the conditions for the collection flow. The possible alternate paths or stages are also displayed with the ability to view the details of the program or activity for a given stage.

Figure 8A:
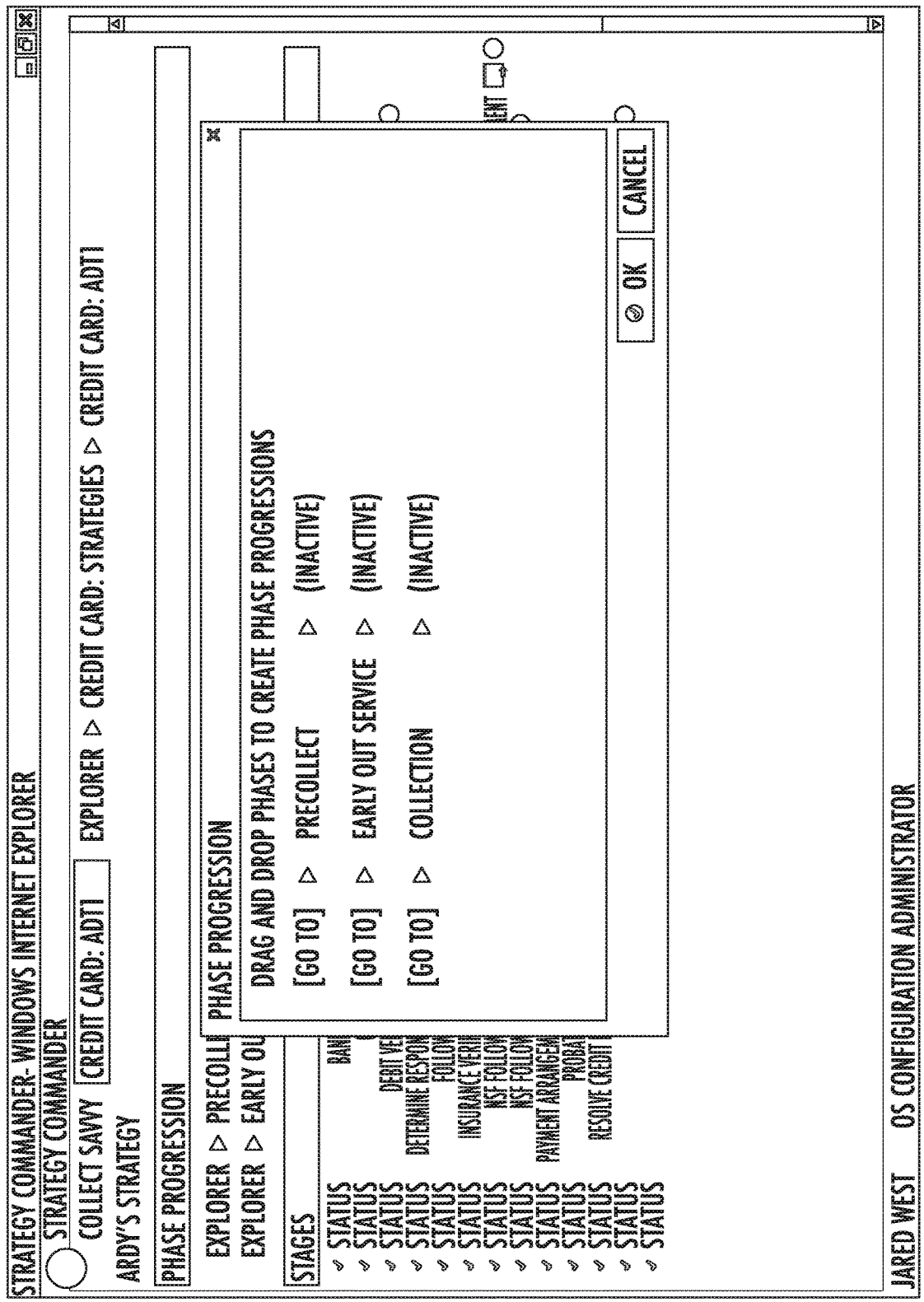
Figure 8B:
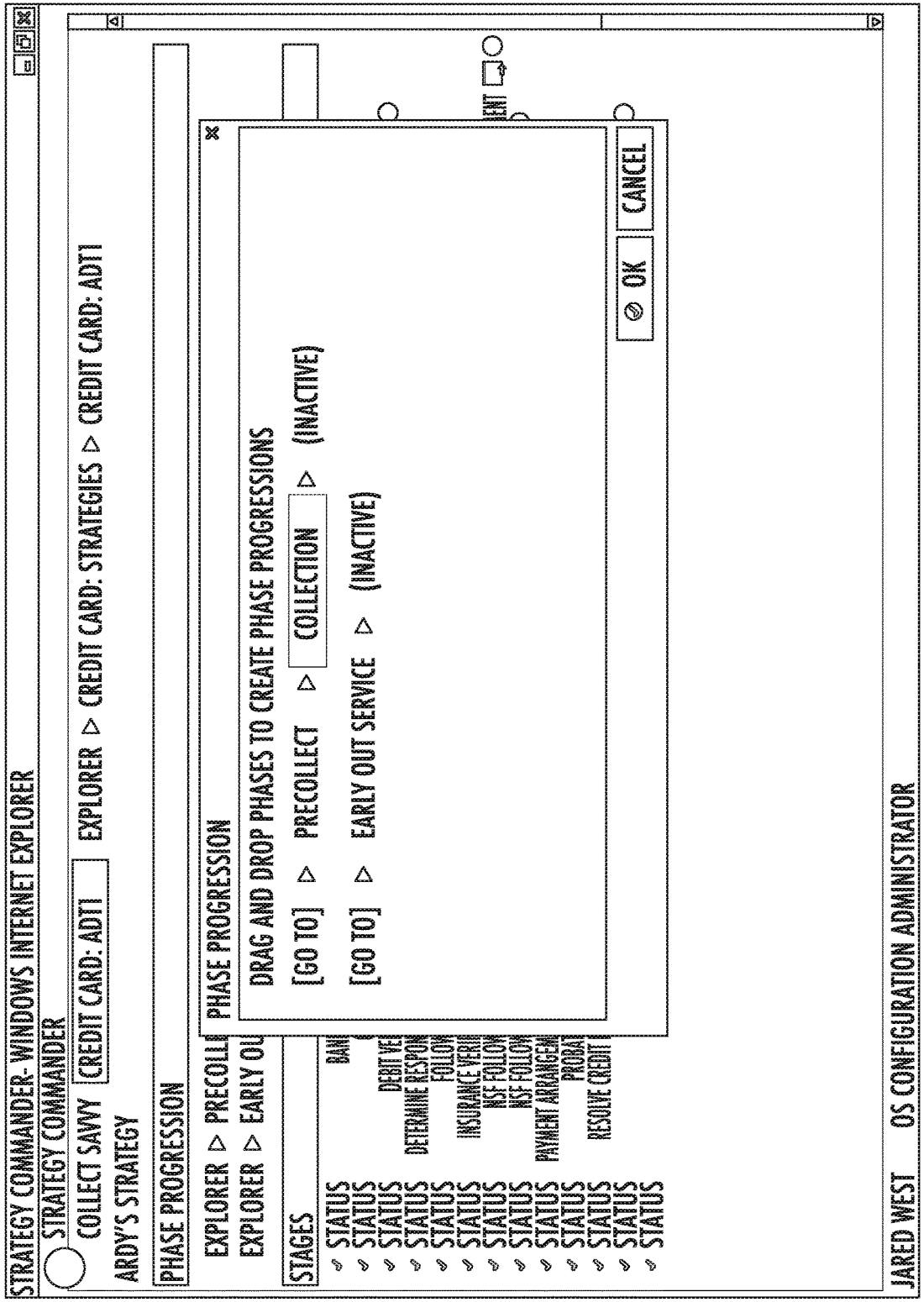

FIGS. 8a and 8b show a graphical user interface where the phase progression portion of FIG. 7 has been selected. The phase progression visualization may be altered by dragging and dropping phases. As shown in FIG. 8a, the Collection phase is positioned beneath the Early Out Service and PreCollect phases. After dragging and dropping the Collection phase next to the PreCollect phase, the Collection phase is positioned next to the PreCollect phase (see FIG. 8b). The alteration of the visualization (e.g., dragging and dropping phases) directly affects the operation of the collection process. In other words, changes to the visualization of the phase progression may result in changes to the collection process performed by the system not just the visualization.

Figure 9A:
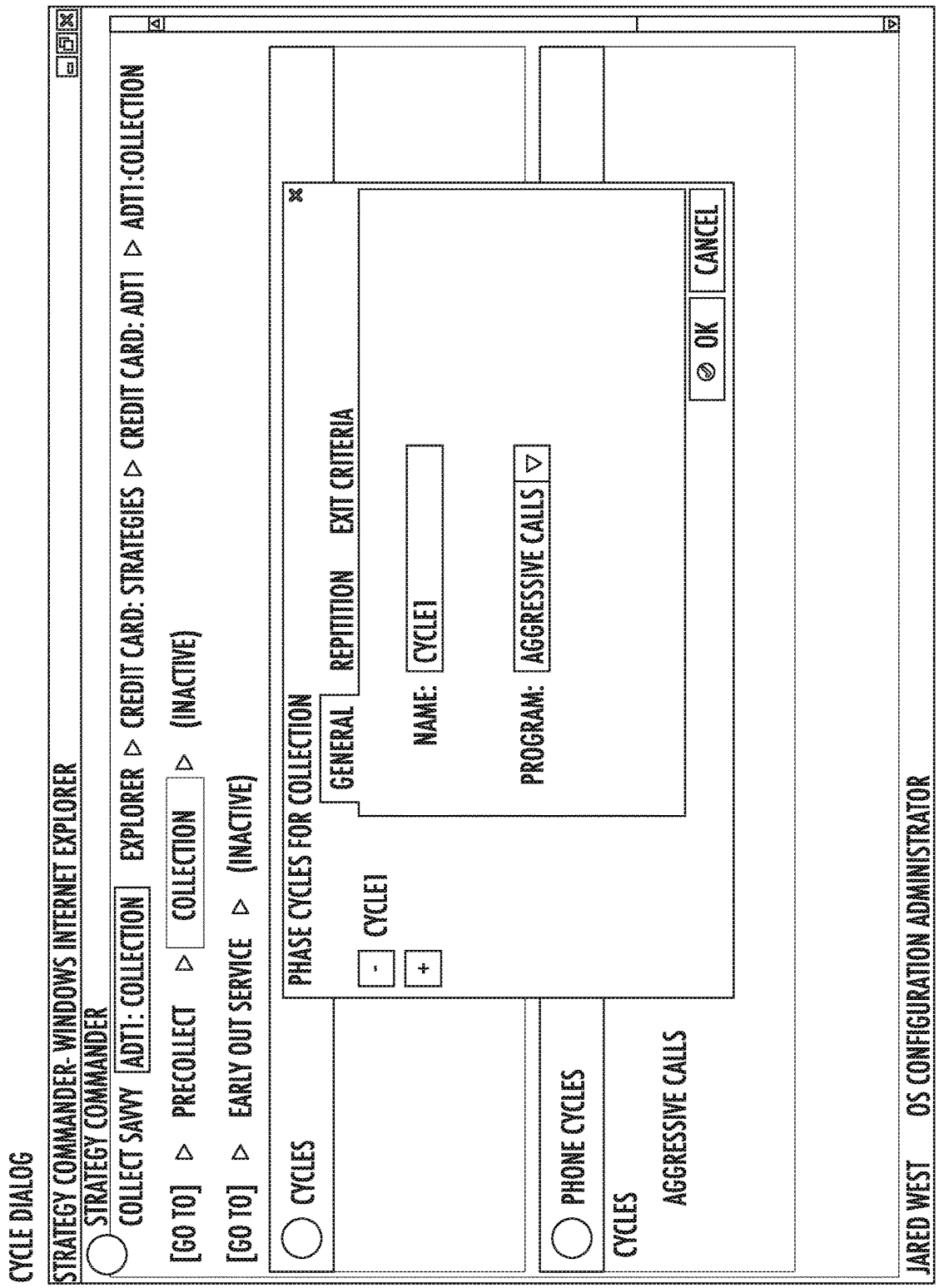
Figure 9B:
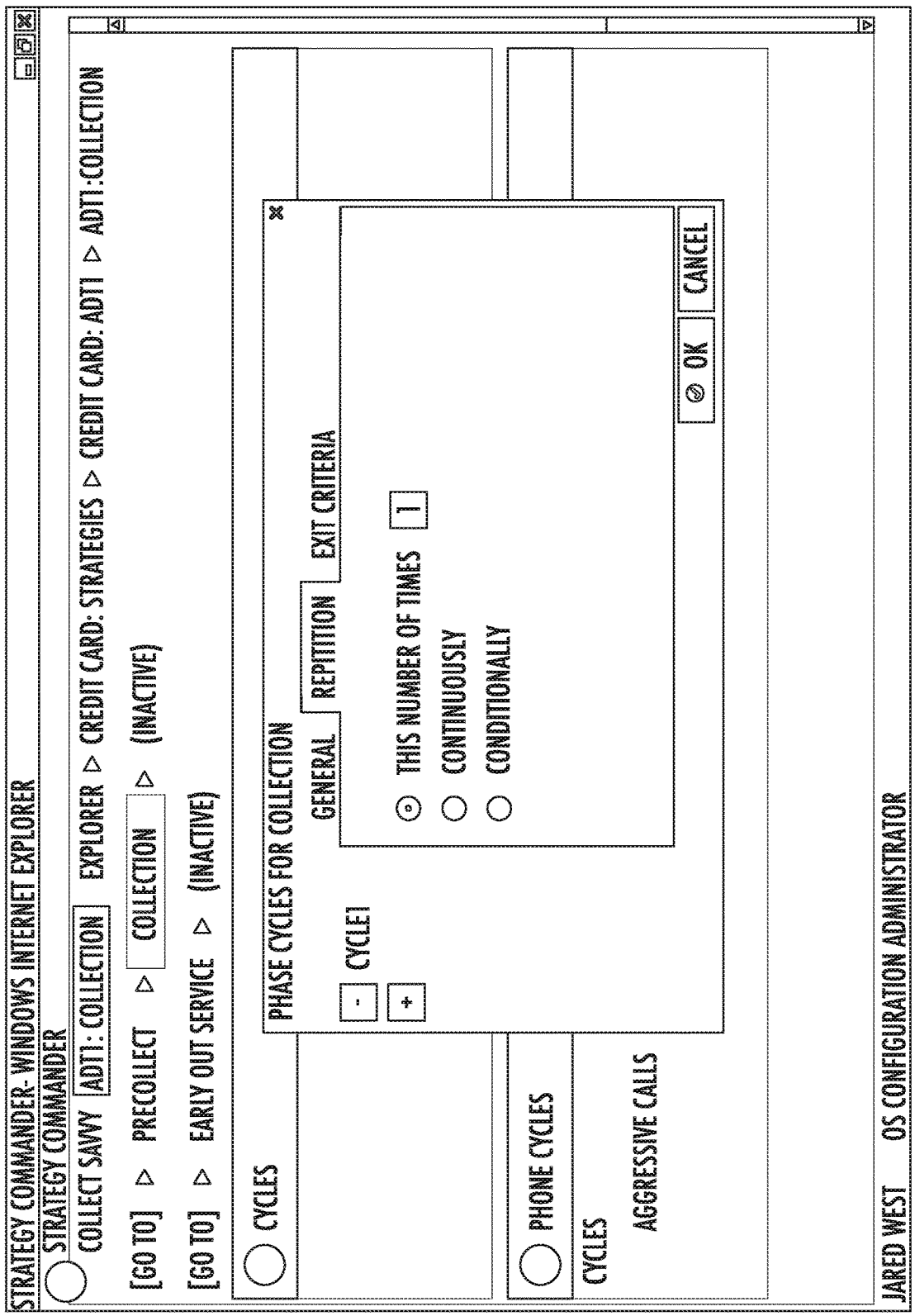
Figure 9C:
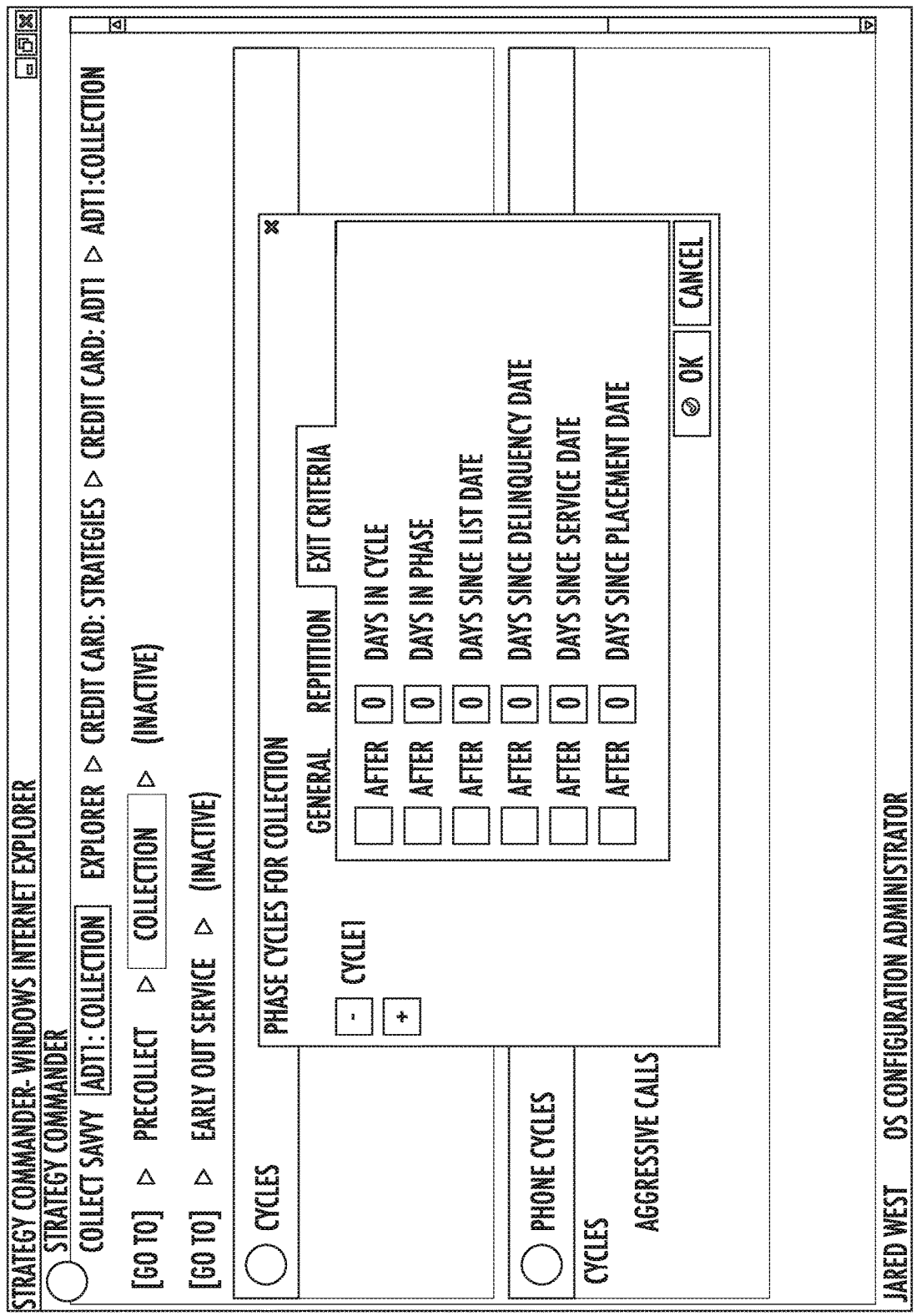
Figure 10:
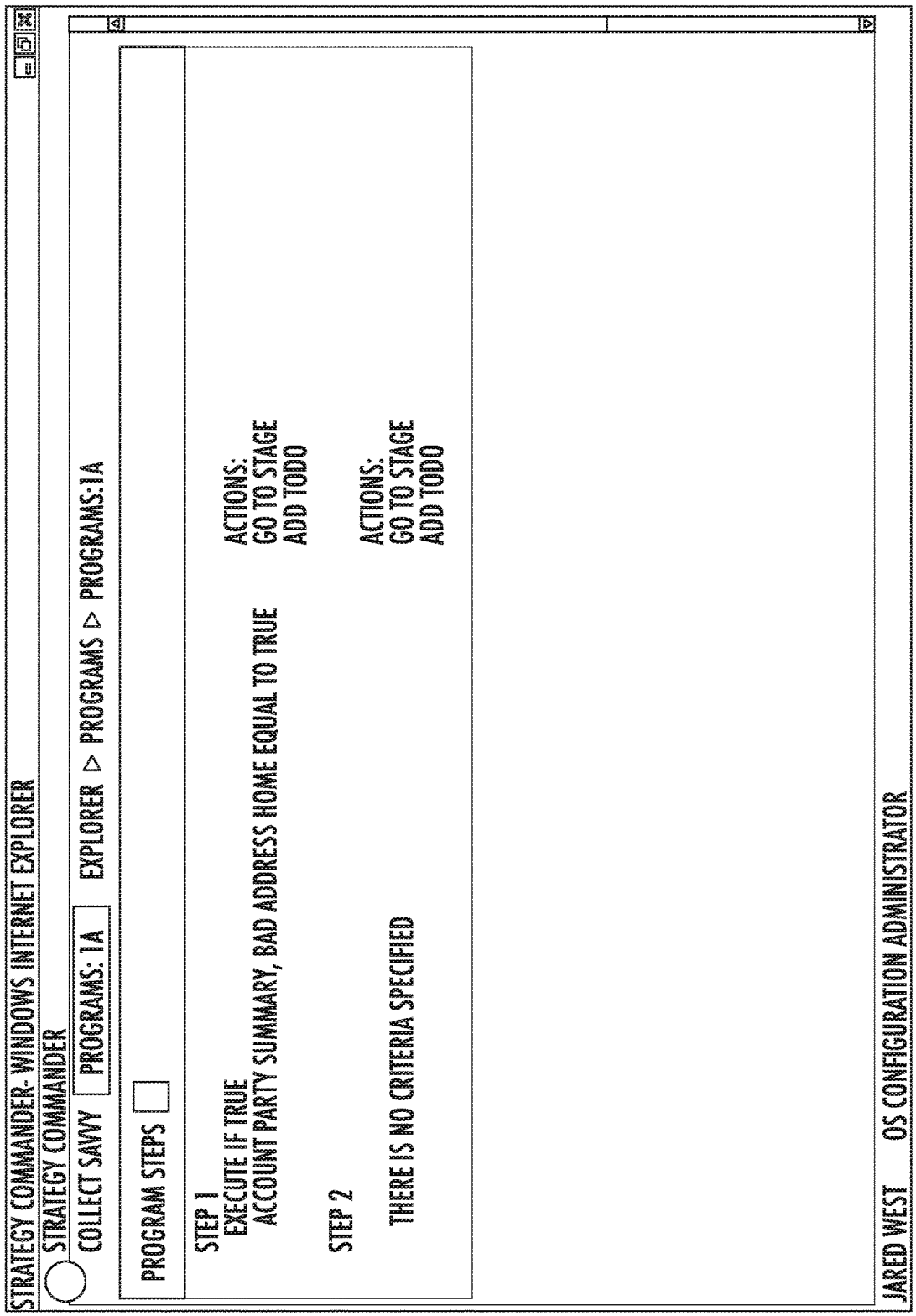

FIG. 9a shows a graphical user interface where the programs for cycles of phases may be chosen. For example, as shown in FIG. 9a, Cycle 1 is selected to have a program of aggressive calls, which may include multiple calls per day, per week, or per month. FIG. 9b shows a graphical user interface where the repetition of activity (e.g., phone calls) may be selected. FIG. 9c shows a graphical user interface where the exit criteria for the cycle may be chosen. As noted previously, the tool may select the appropriate programs and related features automatically. FIG. 10 shows a visualization of the conditions for executing the steps of a program.

The following discussion relating to FIGS. 11-14 describes an example of a computer-readable medium that comprises the steps of the method 100c described above. The computer program described in FIGS. 11-14 is referred to herein as the Best Data tool. It should be noted that the Best Data tool may be on its own or along with or to complement one or more programs. The Best Data tool may also be part of a program, such as a part of the Strategy Commander tool. FIGS. 11-14 show a graphical user interface of the debt collection software showing the results of the Best Data tool for various steps of the method 100c described above. The Best Data tool provides a centralized configuration and visualization area for account party data management processes. It may include a completely automated and controlled execution of the data optimization with both proactive and reactive processing. It should be noted that various aspects of the Best Data tool may be manually driven. For instance, the Best Data tool may present the user with its suggestion for best data but allow the user to ultimately choose.

The Best Data tool may be based on any development platform, such as Microsoft® Silverlight® application. While the Microsoft® Silverlight® application may be used, any other number of development platforms may also be used. As noted above, the Best Data tool incorporates business and collection intelligence to provide a user with a rich, context-aware interface for managing account party data, including continuously or periodically updating the account party data. It uses visualization techniques to make account party data updates easy to identify. The Best Data tool generally allows debt collectors to manage account party data automatically without the need to analyze each and every incoming source of information.

FIG. 11 shows a graphical user interface of the Best Data tool showing demographic information for an account party (Brian Smith). The Best Data tool may permit manual entry of demographic information or other information and/or may be configured to receive such information from various electronic sources.

FIG. 12 shows a graphical user interface of the Best Data tool showing Account Party Summary Details and Account Party Details. In this case, the Account Party Summary Details provides the current account party data (best data). The Account Party Details provides a subset of the information of the Account Party Summary Details that can be shared with a particular client. FIG. 13 shows a graphical user interface of the Best Data tool showing an example of a manual update of the account party's address. FIG. 14 shows that the change in address in FIG. 13 was determined to be the best data by the Best Data tool. As a result, the address for Brian Smith has been updated to the 123 N. High Street.

It should be noted that the method, system, and computer-readable medium for optimizing data of the present disclosure may be used along with or to complement one or more programs. For example, a program that is designed to maximize collection efforts through testing collection strategies and choose the best collection strategy may utilize the Best Data tool to manage the personal account information for debtors.

The following discussion relating to FIGS. 15-19 describes an example of a computer-readable storage medium that comprises the steps of the method 100d described above. The computer program described in FIGS. 15-19 is referred to herein as the Margin Watch tool. FIGS. 15-19 show graphical user interfaces of the Margin Watch tool for various steps of the method 100d described above. The Margin Watch tool provides a centralized configuration and visualization area for receivables management processes.

The Margin Watch tool may be based on any development platform, such as Microsoft® Dynamics® CRM. While the Microsoft® Dynamics® CRM is used, any other number of development platforms may be used. The Margin Watch tool incorporates business or collection intelligence to provide a user with a rich, context-aware interface for monitoring profit margins on accounts. The Margin Watch tool may include the ability for a user to review trends and specific activities for a particular account. It also may offer option-based detail definition to both provide overall clarity and full transparency to the details. For example, the user may optionally specify particular event actions such that the user is prompted for input in certain circumstances, such as, for example, when Margin Watch Expenses approach the Margin Watch Threshold.

The Margin Watch tool generally allows business executives and others that manage receivables to monitor profit margins for accounts without the need for an IT administrator by providing a user-friendly application and automating many of the steps of operation. It improves efficiency of operations through a proactive approach to collection process automation.

As shown in FIG. 15, the Margin Watch tool may include a client contract form configured to receive a Margin Watch Threshold percentage. The contract form in FIG. 15 displays minimum and default settlement percentages, down payment default percent, and a Margin Watch Threshold percentage. In FIG. 15, the Margin Watch Threshold percentage is selected to be fifty (50) percent.

Figure 16:
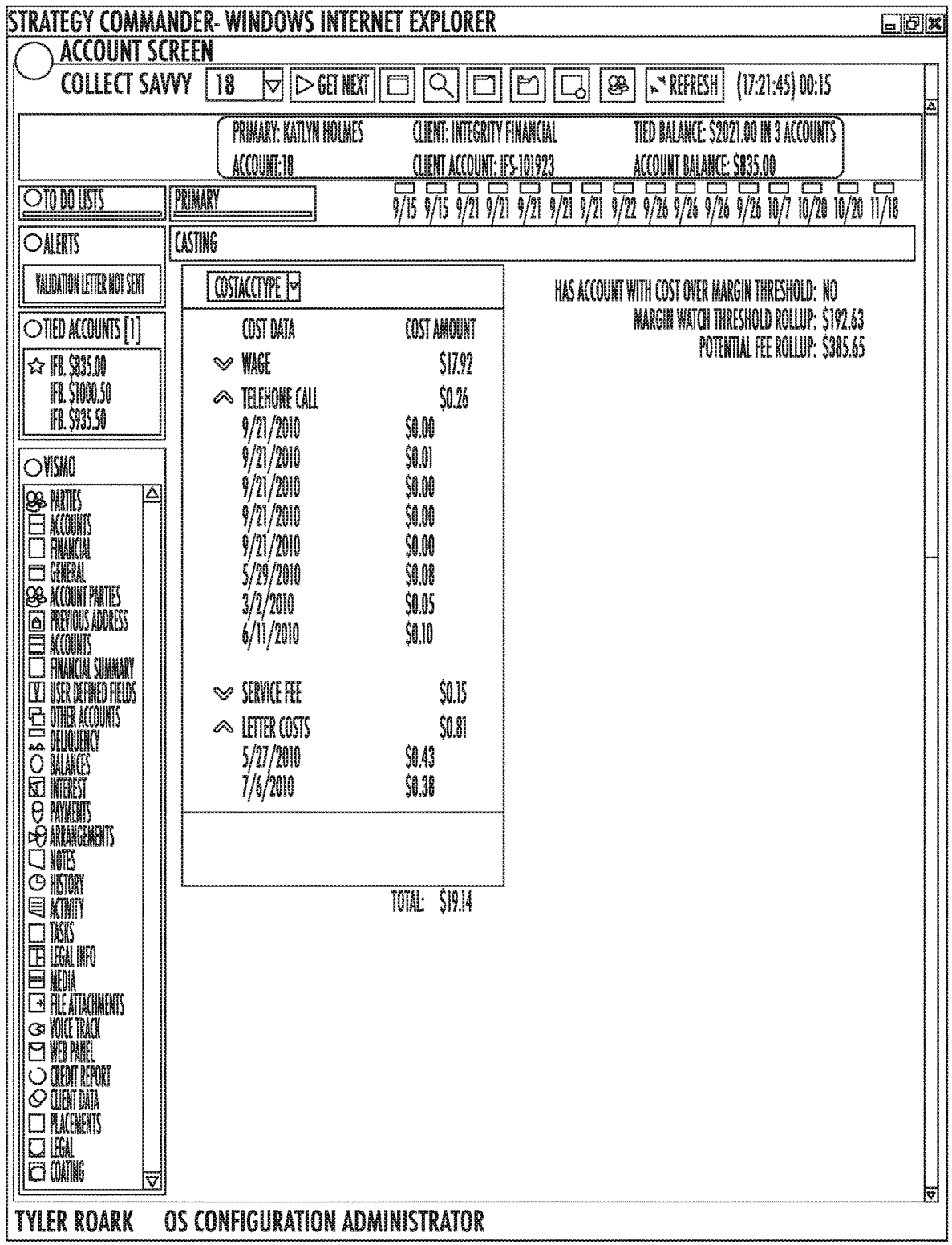

FIG. 16 shows a graphical user interface displaying a costing window and timer. As shown in FIG. 16, a history of costs, including wage, telephone, service fees, and letter costs, may be displayed. Also shown in FIG. 16, a costing window may include an indication of the number of tied accounts and the debt in each of those accounts, the margin watch threshold rollup, and potential fee rollup. The potential fee rollup value indicates the contingency fee amount that may be received for collecting the account or accounts from the client(s) who listed the account or accounts. The margin watch threshold rollup value indicates the sum Margin Watch Threshold figures for the account or accounts that are tied. FIG. 16 also shows two types of timers, which are located at the top of the screen next to the Refresh button. In FIG. 16, one timer indicates the total time (namely, 17:21:45) that has been spent working on the accounts. The other timer shown in FIG. 16 indicates the total time (namely 00:15) that has been spent working on the account during this session. Of course, various other timers may be displayed to show time breakdowns. It should be noted that the timers may be used for calculating costs during the Margin Watch Expenses step 120c.

FIG. 17 shows a graphical user interface displaying an account screen. As shown in FIG. 17, the account screen may include demographic information for the account holder, insurance information, account information, status of the account, and notes regarding activity on the account. Under the Status window of FIG. 17, the cost of expenses for recovery is shown as $9.53. It should be noted that the value of the cost may be highlighted various colors or blink in certain situations. For example, the value of the cost and the term "Cost" may be highlighted red when the Margin Watch Expenses have exceeded the Margin Watch Threshold, highlighted yellow when the Margin Watch Expenses enter within a predetermined range of the Margin Watch Threshold, highlighted green as long as the Margin Watch Expenses are outside of the predetermined range and do not exceed the Margin Watch Threshold. Of course, various other information in the Margin Watch tool may be colored, blinking, flashing, or the like to alert the user to a particular situation, including the occurrence of an Event.

Figure 18:
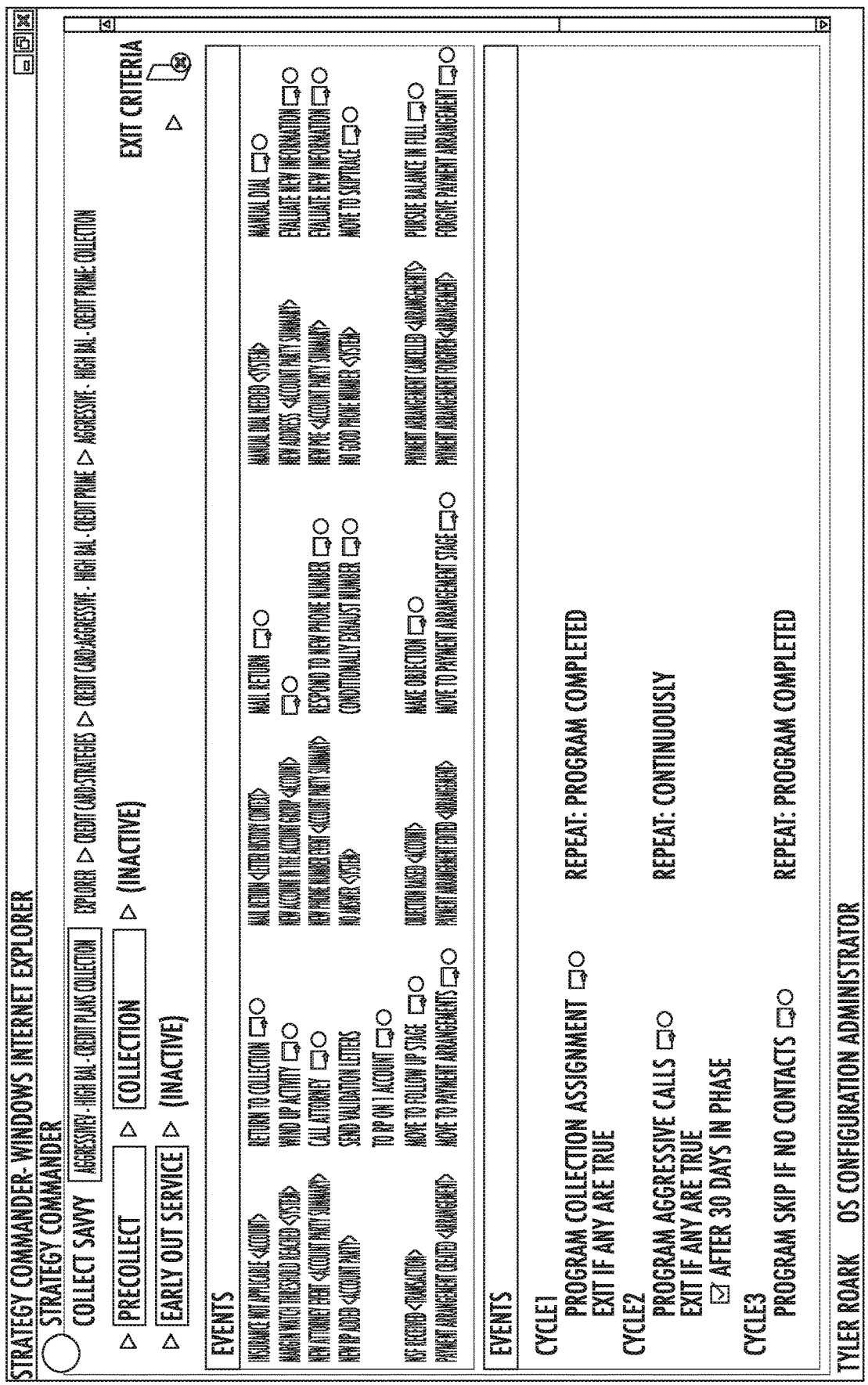
Figure 19:
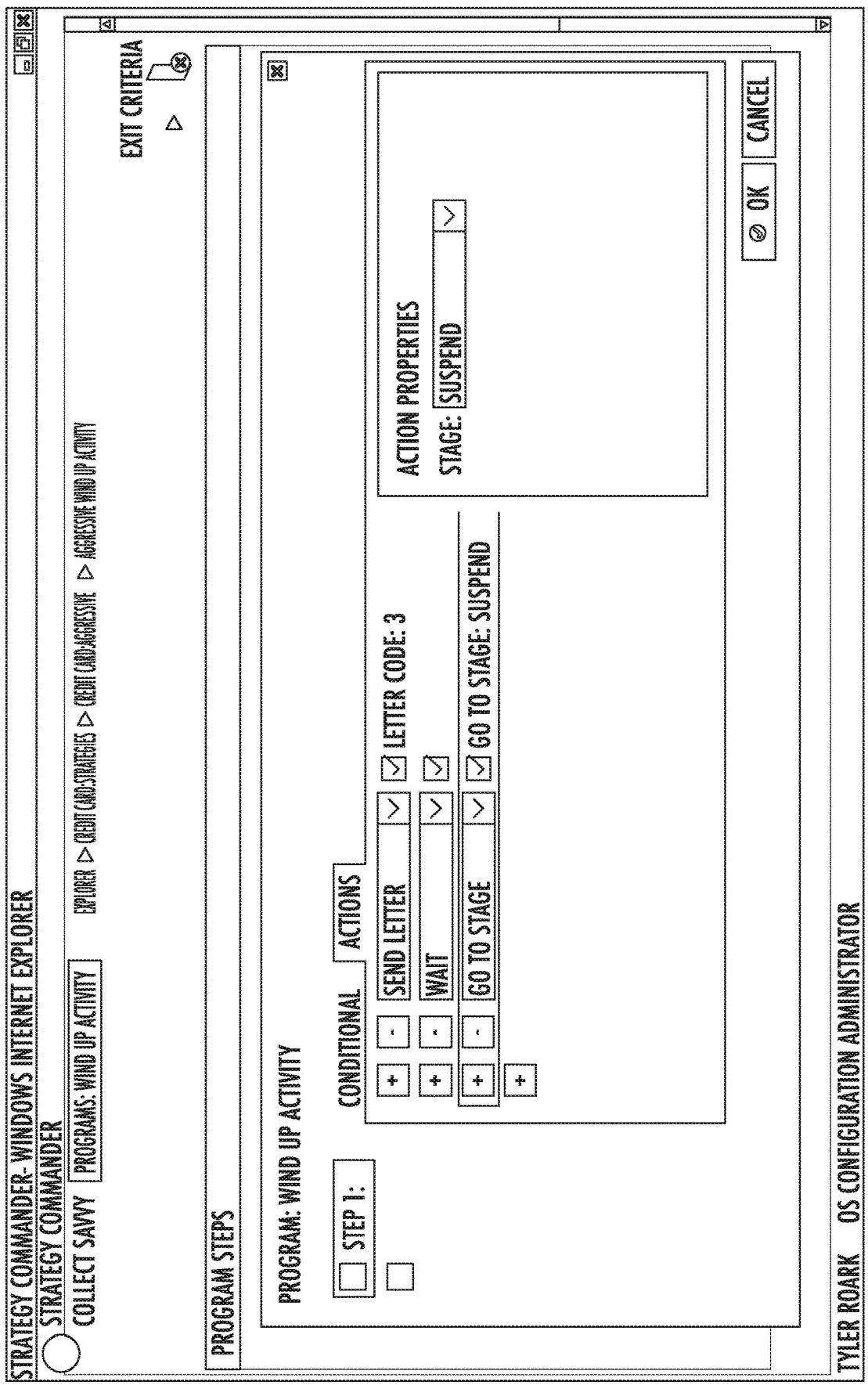

FIG. 18 shows a graphical user interface that provides a user with the ability to customize the actions that will occur because of the occasion of various events, including what phase cycles are implemented for an account. For example, one event in FIG. 18 is "Margin Watch Threshold Reached" along with the corresponding "Wind Up Activity." A user may select the Wind Up Activity icon to customize what actions will be taken when the Margin Watch Threshold is reached. For instance, FIG. 19 shows an example of a graphical user interface allowing for customization of the Wind Up Activity that may be run after Margin Watch Expenses exceed the Margin Watch Threshold. As shown in FIG. 19, the actions selected may include sending a letter, waiting for a period of time, and entering a particular stage. In FIG. 19, the action selected is Suspended, which may include terminating collection activities.

The present disclosure satisfies this need by providing tools and methods to effectively monitor, manage, and update account information based around a strategy that sorts through various inputs of information regarding the debtor and scores such information so that a collection agent can determine what the best information to use is. In this manner, the system takes over control from the collection agent the process of determining and verifying what data to use. As such, the collection agent becomes a data input instead of the primary driver of the system. Moreover, the present disclosure provides an efficient means of organizing, displaying and providing information to a collection agent so that a collection agent can have immediate and easy access to relevant and key information needed to discuss the past due account with the responsible parties on such account.

Figure 20:
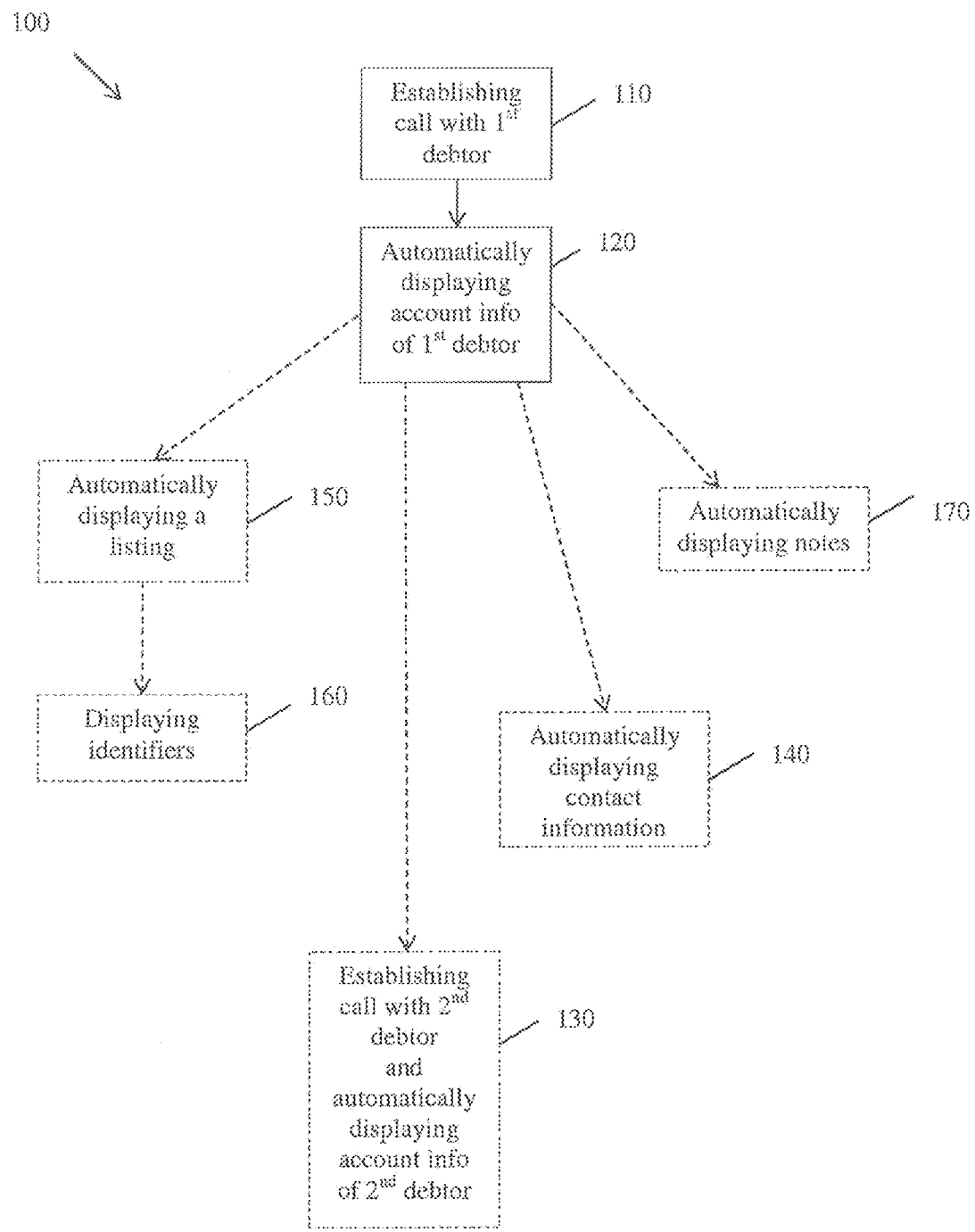
FIG. 20 shows a computer-implemented method for facilitating the collection of receivables according to at least one embodiment of the present disclosure.

FIG. 20 shows a computer-implemented method for facilitating the collection of receivables 1000 according to at least one embodiment of the present disclosure. In FIG. 20, the method 1000 begins with the step 1010 of establishing a first telephone call with a debtor having one or more accounts. A first call may be established by making the first call to the first debtor or receiving the first call from the first debtor. The first call may be made or received in a variety of ways, such as, for example, a user manually dialing or answering a phone or using an automated dialer system, such as the GC dialer or CONTACT SAVVY® dialing system provided by Ontario Systems, LLC.

As shown in FIG. 20, the method 1000 also includes the step 1020 of automatically displaying relevant account information for the debtor in an easily accessible presentation. The presentation may be displayed at various times and based on various actions, such as, for example, when one of the accounts of the debtor is accessed by a user (e.g., a collection agent). Such account information can include a contact history for the debtor that includes the type of contact made (e.g., unanswered phone calls made, phone messages left, e-mails, discussions had with the debtor, letters, and the like) and the total number of contacts with the debtor made since the creation of at least the one or more accounts. For example, the contact history can include the total number of calls ever made to the debtor and/or received from the debtor since the origination of one or more of the debtor's accounts. The contact history can also include the total number of contacts ever made with the debtor. The contact history may further include the total number of calls and/or contacts on one or more single days, for a week, for a month, and other time periods. A contact made with the debtor can include when the debtor has answered a telephone call and when a call from the debtor has been answered. The account information displayed can also include the number of letters sent, payment history, payment arrangements (including indications of whether the arrangement has been kept or broken), or interruptions in the collection efforts (like a dispute raised by the debtor, a cease all communication alert, or a complaint filed by or against the debtor).

Figure 21A:
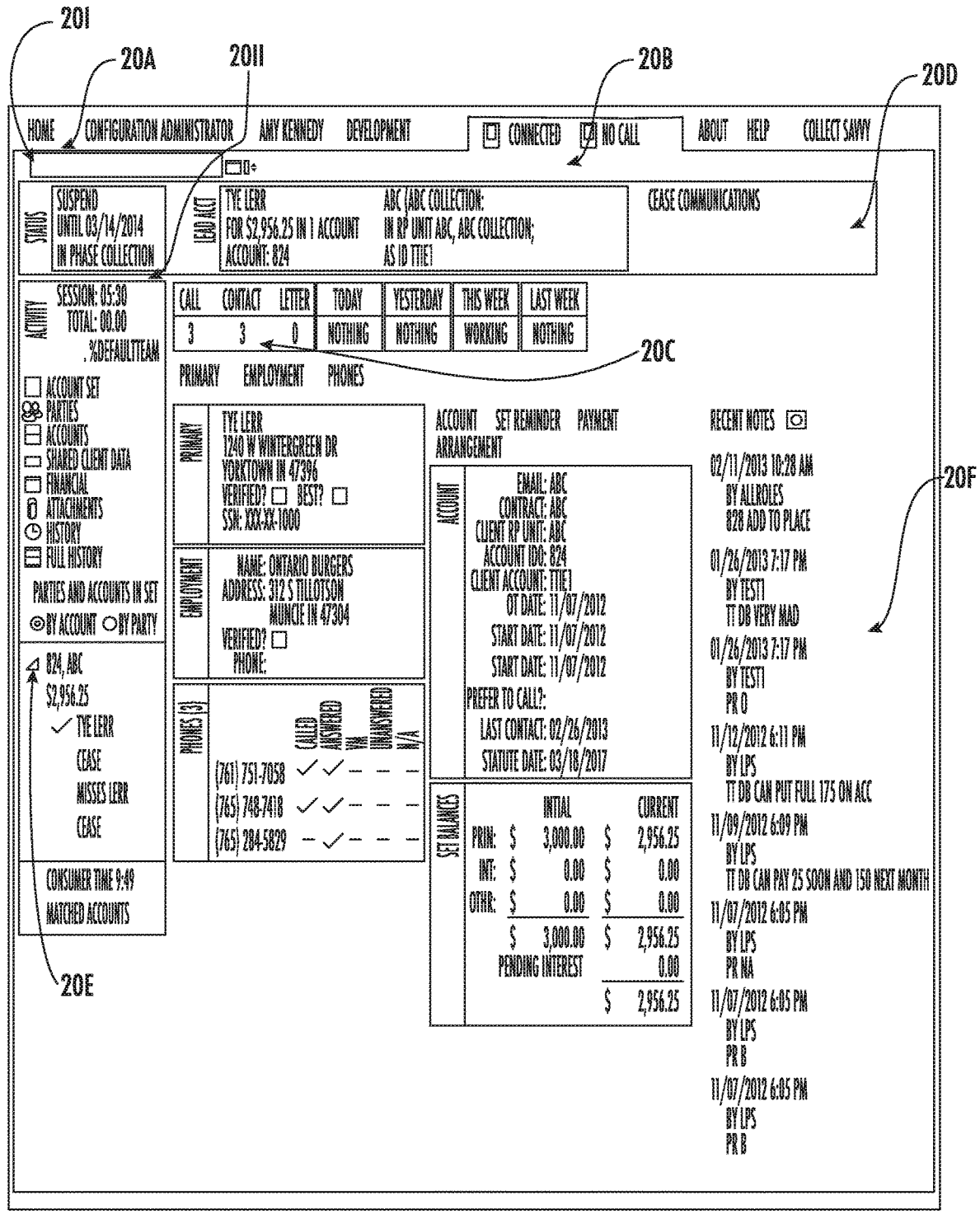
FIGS. 21a-21n illustrate a graphical user interface of Collection Management tool according to at least one embodiment of the present disclosure.

The following discussion relating to FIGS. 21a-21n describes an example of a computer graphical user interface showing steps of method 1000 that is referred to herein as the Collection Management tool. The Collection Management tool may incorporate business or collection intelligence to provide a user with a rich, context-aware interface for monitoring accounts. The Collection Management tool may include the ability to alert users to recent and historical activity for a debtor, to track calls and payments to determine the best way to contact a debtor, and update information for a debtor in real time or near real time. It also may offer displays for a user to quickly and easily determine who is responsible for particular accounts for individuals that share some accounts. The Collection Management tool generally allows individuals that manage receivables to receive current information for accounts in a timely fashion without the need for an IT administrator by providing a user-friendly application and automating many of the steps of operation. It improves efficiency of operations through a proactive approach to collection process automation.

FIG. 21a shows an exemplary embodiment of a graphical user interface of the Collection Management tool displaying account/debtor information of an individual named Tye Lerr, including an Anchor portion 20i and Activity Ribbon 20ii. While the account information is displayed using Anchor portion 20i and Activity Ribbon 20ii, any number of display mechanisms can be used to present this information. In FIG. 21a, the Anchor portion 20i includes a Status section 20a showing the collection process has been suspended for this account, a Lead Account section 20b showing the basic details of the account, and an Alerts section 20d showing that for this account all communications are to be stopped. In FIG. 21a, the Activity Ribbon 20ii includes a Contact History section 20c showing how much and when the debtor has been contacted. FIG. 21b shows another example of an Anchor portion 21i and Activity Ribbon 21ii of the Collection Management tool. In FIG. 21b, the Activity Ribbon 21ii includes an indication that a payment agreement has been broken by the debtor (indicated in this embodiment by a picture of a broken heart).

As shown in FIG. 21a, the Lead Account section 20b displays the name of the debtor (Tye Lerr), the total amount of debt ($2,956.25) in one account, and the name of the creditor (ABC Collection). In FIG. 21a, the Contact History section 20c displays the number of calls made to Tye Lerr (3), the number of times Tye Lerr has been contacted (3), and the number of letters that have been sent to Tye Lerr (0). The Contact History section 20c also includes historical information regarding attempts to contact the debtor, Tye Lerr. As shown in FIG. 21a, the Contact History section 20c indicates that there were no attempts to contact (and therefore no contacts with) Tye Lerr yesterday or last week. Of course, the Contact History section 20c may include various type of information in a variety of formats, such as, for example, it could display each day of previous days individually instead of grouping those days together into "this week." In FIG. 21a, the Alerts section 20d displays "Cease Communications," which informs the user reviewing the account that the user should not contact Tye Lerr. Such a message may be the result of the receipt of a notification stating that the agency should cease and desist all communications to the debtor (e.g., the debtor defers communications to its attorney, debtor files bankruptcy, the debtor disputes the debt, or the debtor is deceased).

The display of the collection activity history can help a collections agent readily/immediately grasp the status of the account or accounts for a debtor prior to and/or during a call with the debtor. For example, suppose an automated dialer system is used to call debtor A. Prior to or concurrent with debtor A answering her telephone, a collections agent having access to a display containing the contact history of debtor A can quickly make some determinations regarding the debtor A. For example, the collections agent can determine that debtor A has been called several times over the last week but has not been contacted (e.g., debtor A has not answered her telephone). This may prompt the collections agent to ask debtor A whether the collections system has the correct contact information for debtor A or whether there is a better phone number to reach the debtor A at during the time being called. In short, the displaying of a debtor's contact history (and other debtor related information discussed below) can shorten the time needed for a collections agent to become familiar with the debtor on the line, being called, or the debtor that is calling in.

FIG. 21c shows a graphical user interface of the Collection Management tool displaying account information for the same individual in FIG. 21a but at a different stage in the collection cycle. In particular, the Status section 22a shows a pre-collection cycle for the account. FIG. 21c also shows the same Lead Account section 22b and Contact History section 22c as FIG. 21a. However, the Alerts section 22d does not display any current alert for the user, which means that the collection agent is free to contact the debtor, Tye Lerr.

FIG. 21d-I shows a graphical user interface of the Collection Management tool displaying a payment arrangement window. As shown in FIG. 21d-I, the payment arrangement window can allow a user to set up various payment plans, including partial payment and settlement of the debt. The payment arrangement window may be accessed by the user during a call with a debtor or at another time or may be automatically presented to the user during a call. Upon payment, the Anchor portion 20i and/or Activity Ribbon 20ii in FIG. 21a may be updated in real time, near real time, or at another time (e.g., after confirmation by a debt manager) to show that the payment has been made. FIG. 21d-II shows a graphical user interface of the Collection Management tool that displays if "Credit Card" payment is elected in field 25h of FIG. 21d-I. FIG. 21d-III shows a graphical user interface of the Collection Management tool that displays if the "Edit Card" button 25k of FIG. 21d-II is selected. In at least one embodiment of the present disclosure, while the graphical user interface of FIG. 21d-III is displayed, voice recording of the session between the debtor and the collection agent ceases or is rendered inaudible. The debtor's credit card number, expiration date, and other billing information may be entered into fields 25m of FIG. 21d-III. This data is saved when the "OK" button 25p of FIG. 21d-III is selected. Once saved, the graphical user interface of FIG. 21d-III disappears and normal voice recording of the session between the debtor and the collection agent resumes.

In FIG. 20, the method 1000 may optionally include the step 1030 of after the first call with the first debtor has ended, establishing a second call with a second debtor having one or more accounts and automatically displaying a contact history for the second debtor. The type of information displayed for the second debtor may be the same as the type of information displayed for the first debtor. However, the display for each debtor may be unique to the respective debtor. Once a collection agent finishes working an account or hangs up her call with the first debtor and instructs the system to call another account, the agent will be fed another account where the dialer has established contact with a second debtor (e.g., step 1030). In such a situation, the collection agent will either be ready to jump from one call to the next or will be ready to start the conversation but will need to continue wrapping up the agent's documentation of its conversation with the first debtor. In the latter case and as described in more detail below, the first debtor screen will continue to be displayed while the agent finishes up its documentation of the agent's call with the first debtor (e.g., in a wrap up screen or in the note section) and a call preview section 24*n* (see FIG. 21*o*) will be displayed giving the agent enough information regarding the second debtor and debtor's account to start the conversation (e.g., the name of the debtor, the amount owed on the account, etc.).

As alluded to above, after the call with a debtor or other party ends, the collection agent may be presented with a call wrap up screen. FIG. 21*e* shows an example of a call wrap up interface according to at least one embodiment of the present disclosure. As shown in FIG. 21*e*, the call wrap up interface may ask the collection agent to indicate the result and observations of the call so that the system may appropriately adjust scores (described below) on phone numbers or other contact information, adjust scores on accounts, engage regulatory safety measures based on the data collected, and/or take other action or make conclusions regarding the respective account.

FIG. 21*f* shows a graphical user interface of the Collection Management tool displaying a Call Preview section 24*n*. The Call Preview section 24*n* shows information relating to an account holder who is different than the account holder who is featured in the Collection Management tool. In FIG. 21*f*, the account holder who is featured in the tool is Ralph Smith, while the account holder in Call Preview section 24*n* is Jim Jones. The Call Preview section 24*n* may appear in the tool for a variety of reasons. For example, the section 24*n* may be populated simply based upon the collection agent indicating she is ready for another a call while she is wrapping up documenting her conversation with a first debtor (e.g., user is finishing a note related to Ralph Smith and the dialer has made contact with Jim Jones, etc.). In another example, the section 24*n* may be populated based upon an incoming phone call from the account holder. In this case, the user may be talking with Ralph Smith on a phone call when Jim Jones calls in to the user. The tool may recognize Jim Jones' phone number and include his information into the section 24*n* for the user to view while still talking with Ralph Smith. This can help the user be a more efficient debt collector.

The Call Preview section 24*n* may be triggered after a user disconnects from a call with a first debtor. For example, a collection agent may update information regarding the first debtor after the call with the first debtor ends (e.g., attending to a wrap up call screen or callback scheduling task) while a dialer system sends a new call for a second (unrelated) debtor to the same collection agent. When the dialer system sends the new (second) call, the tool may provide a preview (in the Call Preview section 24*n*) of key information for the second debtor so the collection agent can start the conversation with the second debtor while finishing updating the information on the first debtor. As shown in FIG. 21*f*, the preview may include debtor name, account balance, creditor, status of account, and any warnings. Of course, the preview may include more or less information regarding the account and account party.

Figure 21G:
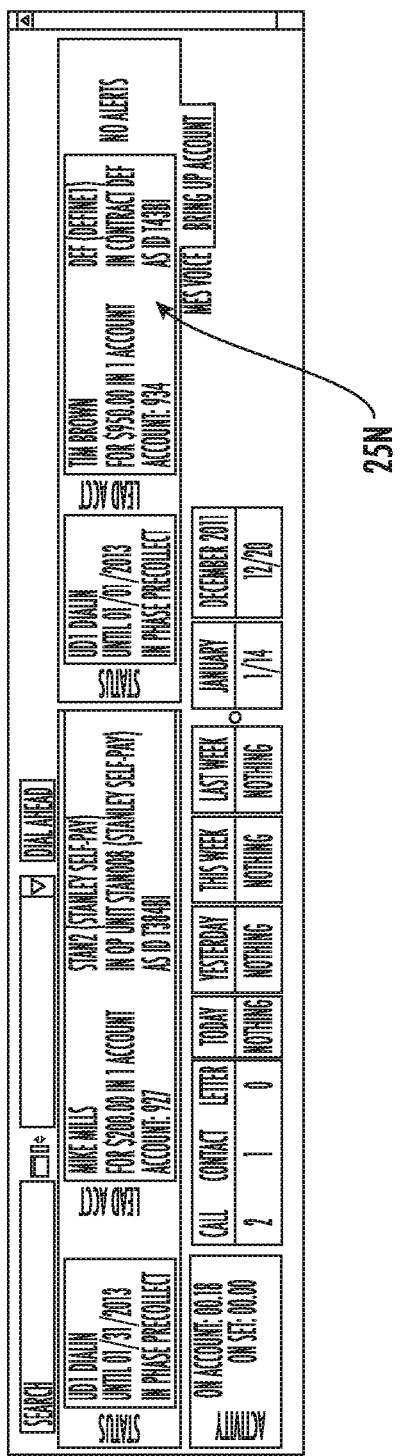

The same preview of information may be displayed in Call Preview section 24 when a first collection agent is attending to a first account belonging to a first debtor and a second collection agent forwards a second account of a second debtor or a call with a second debtor to the first collector. In such a case, the first collector may receive a preview (in the Call Preview section 24*n*) of key information regarding the second debtor and be permitted to accept or deny the transfer. FIG. 21*g* shows another example of a Call Preview section 24 adjacent to an Anchor portion 25*i*. It should be noted that the Call Preview section 24 may be displayed in various other locations so as to be readily available to a user.

After a call or at another time, a collection agent may schedule a callback to follow up with a debtor regarding an account. FIG. 21*h* shows an example of a callback user interface according to at least one embodiment of the present disclosure. As shown in FIG. 21*h*, the collection agent can record various information, including, for example, the desired date and time of the callback, the team and the person to make the callback, the desired phone number to call, and/or a comment about why the callback should be made. While scheduling a callback, a user may be able to view the availability of any user to help avoid overlapping appointments. After the callback is created, the account may be tagged or otherwise identified with a callback marker that enables any user to see the scheduled callback, reschedule it, or snooze the callback for a short time.

Figures 21I, 21J:
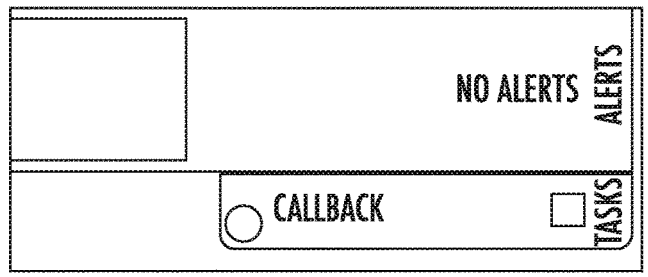

FIG. 21*i* shows an example of a callback interface that may be presented to a user at or near the time of the scheduled callback according to at least one embodiment of the present disclosure. As shown in FIG. 21*i*, the callback interface may allow a collection agent to delay the callback, dismiss the callback, update the callback information, and otherwise identify the basic information regarding the callback. In at least one embodiment of the present disclosure, if a particular collection agent is unable to handle the scheduled callback at the scheduled time, the callback may roll to another collection agent, such as an agent that is part of a particular collection team. FIG. 21*j* shows an example of how a collection agent may be notified of a callback appointment while using the Collection Management tool. In FIG. 21*j*, the collection agent may select the callback tag (which is adjacent to the Anchor portion) to receive the callback user interface shown in FIG. 21*i*.

As shown in FIG. 20, the method 1000 may optionally include the step 1040 of automatically displaying contact information for the first debtor. The contact information may include a variety of data regarding the first debtor, such as, for example, one or more residential addresses for the first debtor, one or more phone numbers for the first debtor, and/or one or more e-mail addresses of the first debtor. A collections agent may use this information to verify with the debtor that such contact information is current.

FIG. 21*k* shows a graphical user interface of the Collection Management tool displaying a Potential Addresses section 25*a*. In section 25*a*, three addresses are shown that have previously been or may be the proper address for the debtor (in this case, Tye Lerr). A user may select or verify one of these addresses as the correct address for the debtor. FIG. 21*k* also shows a Telephone Score section 25*b*. In section 25*b*, a listing of telephone numbers is shown with several columns indicating whether the telephone number is a mobile number, whether the telephone number has been verified, whether the telephone number is bad, and the like. Section 25*b* also includes a score rating (in this case, the rating is indicated by the number of stars) just beneath the corresponding telephone number. FIG. 21*k* also shows two notes (each indicated by reference numeral 25*c*) that have been selected for preferential treatment (also referred to as "pinned"). As shown in FIG. 21*k*, each of these pinned notes has been moved to the top of the notes listing and highlighted to allow a user to easily locate this information.

FIG. 21*l* shows a graphical user interface of the Collection Management tool displaying an editable Primary Contact section 23*p*. As shown in FIG. 21*l*, the user can edit the Primary Contact Section 23*p* to update the account holder's contact information. The account holder's contact information may be updated in other ways, such as, for example, automatically once another user verifies that new contact information (e.g., new phone number, new residential address) is the best contact data for the debtor.

As shown in FIG. 20, the method 1000 may optionally include the step 1050 of automatically displaying a listing of each of the accounts of the first debtor. In FIG. 20, the method 1000 may optionally include the step 1060 of displaying identifiers configured to distinguish tied accounts of the first debtor in the listing from the accounts of the first debtor that are not tied to another debtor. In addition or alternatively, the parties themselves may be colored a certain color or there may be colored dots in front of the parties names in the listing to indicate who are responsible parties on the particular account and thus, can discuss the account. The collections agent can, for example, readily identify which accounts the agent is legally allowed to discuss (and/or should even bother discussing) with the particular debtor.

Referring to FIG. 21*a*, the Collection Management tool may include a Tie/Party section 20*e*, which includes related parties and tied accounts. As shown in FIG. 21*a*, the Tie/Party section 20*e* displays two debtors, Tye Lerr and Misses Lerr. There are two debtors listed in this section 20*e* because at least one of the accounts is shared (or tied). That is, they both are responsible for at least one of the accounts. FIG. 21*m* shows another example of a Tie/Party section 21*e*. In FIG. 21*m*, the Tie/Party section 21*e* lists the account balance, the parties related to this particular account (namely, Tye Lerr and Misses Lerr), indicates which of the parties the collection agent can contact (via color indicators), and includes a message regarding the status of one of the parties (namely, "cease" communications with Misses Lerr). As shown in FIG. 21*c*, the Tie/Party section 22*e* includes a listing of related parties to an account set, as well as a listing of all of the accounts for one of the parties, namely Tye Lerr.

As shown in FIG. 20, the method 1000 may optionally include the step 1070 of automatically displaying one or more notes relating to the previous calls to the first debtor. The notes may include brief messages that summarize what was discussed or decided on during a call with the debtor. For example, if the debtor mentions that he made a payment on a certain day, the collections agent may memorialize this information in a note. The note may appear in the display with other debtor information each time the collections agent calls or receives a call from the debtor. In at least one embodiment of the present disclosure, a collections agent can select (or "pin") a note, which will cause it to be distinguished as important and/or moved to the top of the notes list. As shown in FIG. 21*a*, the Collection Management tool may also include a Notes section 20*f*, which includes messages listed by one or more users regarding the debtor, such as descriptions of communications with the debtor. FIG. 21*l* shows an example of a Notes section 21*f* of the Collection Management tool with a note that has been pinned.

It should be noted that the Collection Management tool may include various visual representations of outstanding verifications and/or missing information for collection agents. Such visual representations may appear at various times and/or upon various actions, such as, for example, when a connected call is detected. FIG. 21*n* shows an example of an Address section of a user interface of the Collection Management tool. In FIG. 21*n*, the Address section 30*b* that has blanks or check boxes for the collection agent to complete, if possible, and flags to indicate to the collection agent that there are blanks and/or check boxes requiring input.

Referring to FIG. 21*k*, a Dialer section 25*d* is shown in a user interface of the Collection Management tool. The Dialer section 25 can include an indication of whether the dialer system is active. Of course, other information regarding the activity of the dialer system may be displayed in the Dialer section 25. It should be noted that a dialer system may be shown in any display of the Collection Management tool or any display described above.

A graphical user interface according to the present disclosure, such as the graphical user interfaces shown in FIGS. 21*a*, 21*c*, and 21*f*, provide a user of a Collection Management tool of the present disclosure, such as a collection agent, with abundant account and debtor information on a single screen. Such a user is not required to navigate between multiple interfaces or execute queries in order to conduct a transaction with a debtor. Visual indicators and icons used in such a graphical user interface permit the efficient communication of information, and preserve screen space for textual data. Activity ribbons used in such a graphical user interface efficiently summarize the history between a user of the Collection Management tool of the present disclosure, such as a collection agency, and the debtor and account under management. Content-rich alerts used in such a graphical user interface efficiently inform a user of the Collection Management tool of the present disclosure, such as a collection agent, of upcoming activities in the collection agent's workflow or changes in the debtor or account information.

Figure 22:
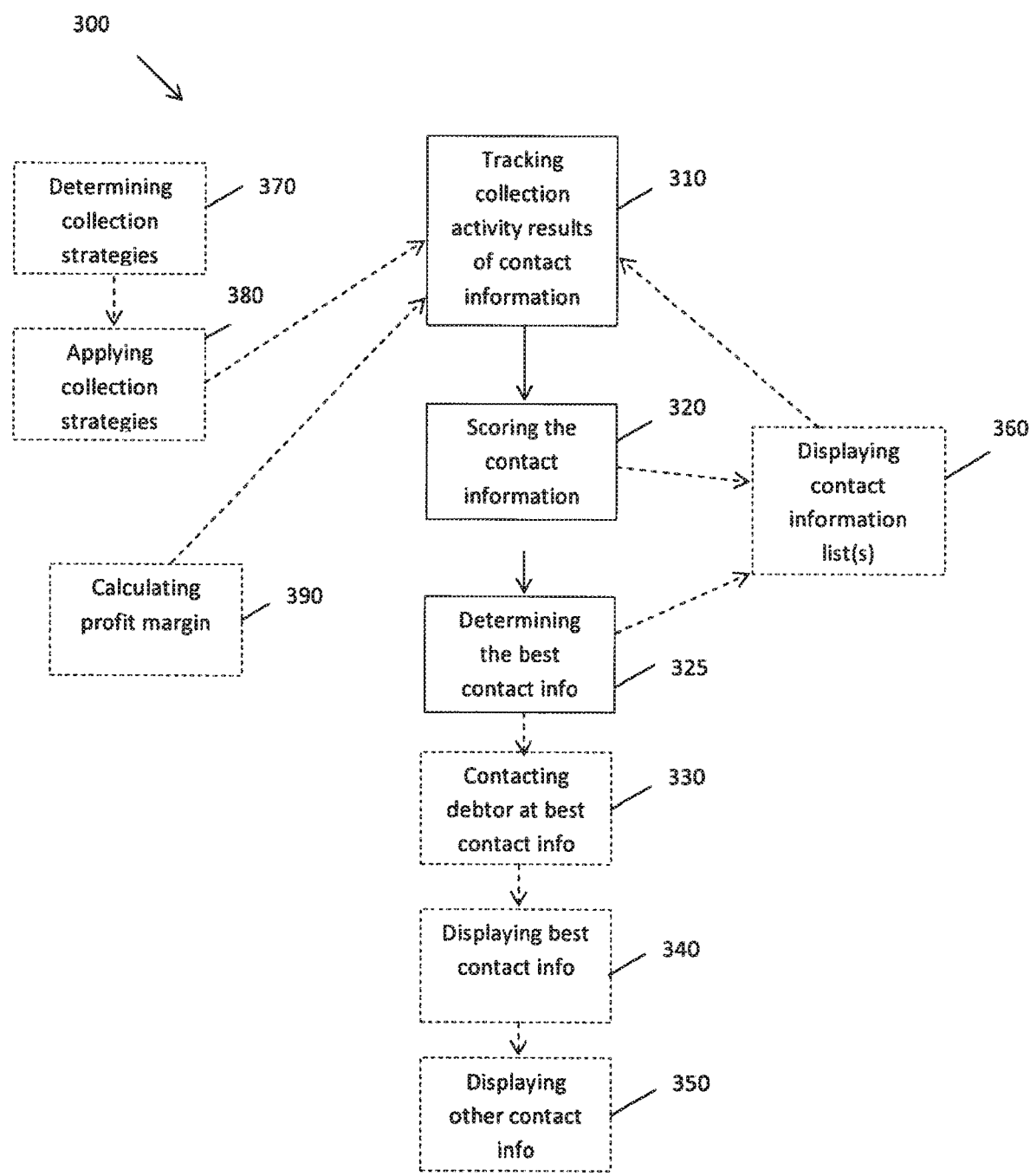
FIG. 22 shows an exemplary embodiment of a computer-implemented method for the management and collection of receivables according to at least one embodiment of the present disclosure.

FIG. 22 shows an exemplary embodiment of a computer-implemented method for automatically optimizing the management and collection of receivables 300 according to the present disclosure. In FIG. 22, the method 300 includes the step 310 of tracking collection activity results for contact information of a debtor, such as, for example, phone numbers, e-mail addresses, and postal addresses. The collection activity results may include various information about contact efforts using a particular phone number, e-mail address, postal address, and the like. For example, the collection activity results may include the number of times the debtor has been contacted at a respective telephone number about one or more accounts, the time of day that the contact has been made, and/or an hour by hour breakdown of when contact has been made. The collection activity results and other debtor information discussed herein may be stored in a database, a dialer system, and the like.

In at least one embodiment of the present disclosure, if a dialer system is used, the dialer may assist with tracking various contact occurrences, such as, for example, a busy signal, disconnected line, voicemail reached, no answer, answered within a certain number of rings, and the like. In at least one embodiment of the present disclosure, if the collection agent manually calls debtors, a dialer system may still gather information about each call, such as, for example, whether the call is answered within a certain number of rings, is disconnected, or busy in order to get reliable data. In addition or alternatively, the dialer system may determine when a call attempt is complete or other disposition of the call in order to save the collection agent time. A Collection Management tool according to an embodiment of the present disclosure tracks all contact attempts and their results and gathers information from the dialer and the agent to determine the results of the call. Tracking includes calls not made via automatic dialing. As a result, such data is available for analysis and workflow response.

As shown in FIG. 22, the method 300 also includes the step 320 of scoring the contact information and the step 325 of determining a best contact data for the debtor based at least partially on the scores for the contact information. The scoring step 320 may be based on a variety of factors, such as, for example, the success rate of making contact with the debtor and verification of contact information for the debtor by a collection agent. For example, if two telephone numbers are pursued for a debtor and the first number results in the successful contacting of the debtor and the second number does not, the first number may be scored higher.

The scoring step 320 may weight factors in various ways or otherwise be based on predetermined rules. In at least one embodiment of the present disclosure, the scoring step 320 may be automatically performed by adding (or multiplying) a contactability number at a particular time and a contactability number for a particular contact number, address, etc. The contactability number for a particular contact number, address, etc. may be determined according to the number of times the contact number, address, etc. has been verified, right person has been called, when the number, address, etc. was last modified, number of attempts to contact this number, address, etc., and the like. The contactability number for a particular time or timeframe may be determined according to how many times has the right person been contacted during this time or timeframe, whether the contact information is for the debtor's home and the time is during debtor's work hours, whether the contact information is for the debtor's work and the time is during debtor's work hours, the number of attempts during this time and/or timeframe, and the like.

In at least one embodiment of the present disclosure, the scoring step 320 may include determining an overall contactability score for each contact information by summing the following line item considerations:

multiplying 64 points times the number of right party calls (RPC) in the last number of specified days (X days) divided by the number of calls during that time;
if verified in the last X days, add 32 points;
if there have been no attempts on this phone in the last X days, add 16 points;
if the number is new within the last X days, add 8 points;
if ever had an RPC or the phone number has ever been verified, add 4 points;
multiplying 2 points times a trust level (source of information manual, data svc, original creditor, migration, etc.);
if no call attempts in the last X days, add 1 point;
add 48 points for every RPC in the selected hour;
−12 points for each call attempt in the selected hour (attempts less connects, busies, fails, or withdraws);
if the phone is a home number and it is during the debtor's work hours (default value may be 9-4), add −24 points;
if the phone is a home number and it is outside of debtor's work hours, add 24 points;
if the phone is a business phone and it is during work hours, add 24 points; and
if the phone is a business phone and it is outside of the debtor's work hours, add −24 points.

Of course, it should be understood that the example provided above may be altered in various ways in order to achieve more accurate scoring of contact information. For example, additional line items may be introduced, existing line items may be removed, point values may be adjusted, and other parameters may be adjusted.

It should be noted that various types of contact information (e.g., e-mail addresses, postal addresses, and telephone numbers) may be scored differently depending on the type of contact. For example, the scoring step 320 for postal addresses may be based on a variety of considerations, including, but not limited to, the source of the address, how long the address has been known, whether letters were returned as undeliverable, and the like. If a notification of returned mail is received and after a discussion with the debtor, the address may be recorded as bad and the "next best" address will take its place. One or both of the tracking step 310 and scoring step 320 may be performed in real time, at predetermined intervals, or other timeframes.

As noted above, the method 300 also includes the step 325 of determining a best contact data for the debtor based at least partially on the scores for the contact information. In at least one embodiment of the present disclosure, the best contact data may be determined solely by the scoring step 320. That is, the contact data with the best score from scoring step 320 may be the best contact data. In at least one embodiment of the present disclosure, the step 325 may consider various factors and information, such as, for example, the time of day and the like.

In at least one embodiment, a Collection Management tool of the present disclosure comprises dynamic contactability scoring and account contactability ranking. If information in a debtor account changes, the contactability score for that debtor is re-computed. The debtor's contactability score then is automatically ranked against other debtor accounts in the contact queue and made available to the automatic dialer. Based on its contactability score, the account could be the next account dialed even if moments before it had not been in the contact queue. An example of this would be an account that is paused in collection activity while the agency awaits information from the original creditor. A customer service representative may get new information about the account from the original creditor, and then updates the account with that new information. The contactability score is computed and the account is immediately made available to the dialer.

In at least one embodiment, a Collection Management tool of the present disclosure comprises a method for automatically preventing a call to a debtor if such a call would violate legal, regulatory, or policy considerations. In such an embodiment, before a call to a debtor is placed the account/debtor information, call history, time of day, and other factors are evaluated against predetermined legal, regulatory, and/or policy considerations. If such an evaluation determines that placing the call to the debtor would violate applicable legal, regulatory, or policy considerations, the call is skipped until such time as it would not violate applicable legal, regulatory, or policy considerations.

As shown in FIG. 22, the method 300 may optionally include the step 330 of calling or contacting the debtor using the best contact information. As noted above, such a call or other contact may be manually performed or automatically performed (e.g., using a dialer system). Also, the method 300 may optionally include the step 340 of displaying the best contact information for the first debtor. For instance, all or a portion of a debtor's best contact data may be displayed in a manner that is readily available to the user. As shown in FIG. 22, the method 300 may optionally include the step 350 of displaying one or more additional entries of contact information. For example, a best telephone number may be listed above several other phone numbers in a user interface.

As shown in FIG. 22, the method 300 may optionally include the step 360 of displaying a list of contact information based upon the scores of the contact information with the best contact information at the top of the list. After step 360, the method 300 may optionally repeat the tracking step 360, scoring step 320, and determination of best contact data step 325 and then update the list. As shown in FIG. 22, the method 300 may optionally include the step 370 of determining collection strategies for one or more accounts for the first debtor and the step 380 of applying the one or more collection strategies to one or more accounts of the first debtor. In FIG. 22, the steps 370, 380 are performed before the tracking step 310. Alternatively, the steps 370, 380 may be performed after the tracking step 310 or both. In any event, the results of the collection strategies may be included in the determination of the best contact information step 325. It should be noted that a collection agency may require that the contact history, contact information, and other debtor information be updated, vetted, or otherwise current (e.g., verified within the last 2 months) before a collection strategy is applied to one or more accounts.

It should be noted that in one or more of methods 1000 and 300, a collections agent may send a call to the agent's supervisor and the supervisor's computer may then display contact history of the first debtor and other information regarding the first debtor, even if the call is sent from a terrestrial telephone line to a smart phone. Supervisors thereby are more accessible to their subordinates and can accept an account and voice call transfer wherever they are. If not already indicated, it should also be noted that one or more of the steps described above may be performed automatically.

It should be noted that the systems, methods, and computer-readable media disclosed herein and portions thereof may be combined with, integrated with, incorporated into, or otherwise implemented with various other systems, methods, and computer-readable mediums disclosed herein and portions thereof. For example, methods disclosed elsewhere in this application (e.g., methods 100a,b) may be performed prior to step 1010 of method 1000 of the present disclosure and may be at least partially responsible for generating the call in step 1010. For example, the call may be part of the implementation of a strategy. In another example, methods 100a,b may be triggered in view of the best contact information determined in method 300 at step 325. In another example, the Margin Watch tool may support or perform the actions in step 390 of method 300. In another example, the Strategy Commander tool may support or perform the actions in step 370 and/or step 380 of method 300. The possible combinations of methods and systems listed above are not exhaustive but provided as examples. It should be appreciated that other combinations and interactions of the methods may be implemented in order to provide a user with the tools and information to effectively collect unpaid debt.

Figure 23:
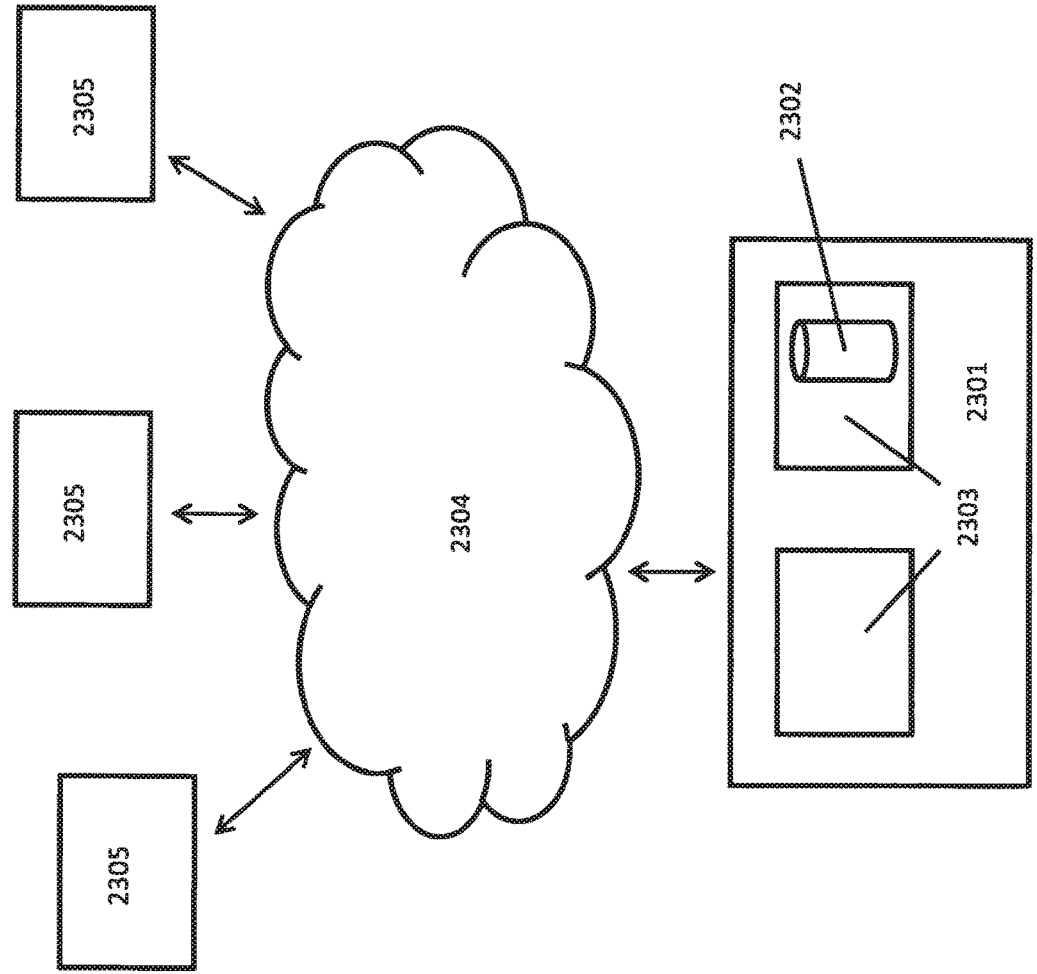
FIG. 23 shows a block diagram of at least one embodiment of a system for management and collection of receivables according to the present disclosure.

FIG. 23 shows a block diagram of at least one embodiment of a system for managing and collecting receivables according to the present disclosure. Shown in FIG. 23 is server 2301, on which database 2302 is stored. Server 2301 comprises one or more host servers, computing devices, or computing systems configured and programmed to carry out the functions allocated to server 2301 according to the present disclosure. Server 2301 comprises at least one processor and at least one form of memory, including but not limited to a recordable computer-readable medium. Server 2301 may be operated by, or under the control of, a "system operator," which may be an individual or a business entity. For purposes of clarity, server 2301 is shown in FIG. 23 and referred to herein as a single server. Server 2301 need not, however, be a single server. Server 2301 may comprise a plurality of servers or other computing devices or systems connected by hardware and software that collectively are operable to perform the functions allocated to server 2301 according to the present disclosure. In at least one embodiment, server 2301 may be operable to be a web server, configured and programmed to carry out the functions allocated to server 2301 according to the present disclosure.

In the embodiment shown in FIG. 23, database 2302 resides on server 2301. Database 2302 may, however, reside on a server or computing device remote from server 2301, provided the remote server or computing device is capable of bi-directional electronic communication with server 2301. The remote server or computing device upon which database 2302 resides may be operated by, or under the control of, the system operator. Preferably, the remote server or computing device upon which database 2302 resides may be electronically connected to server 2301 such that the remote server or computing device is in continuous bi-directional communication with server 2301. For purposes of clarity, database 2302 is shown in FIG. 23 and referred to herein as a single database. It will be appreciated that database 2302 may comprise a plurality of databases connected by software that collectively are operable to perform the functions allocated to database 2302 according to the present disclosure.

In at least one embodiment of the present disclosure, server 2301 comprises at least two computing devices in a redundant configuration. In such an embodiment, in the case of a failure of one such computing device or a failure of the connection between one such computing device and network 2304, the other such computing device will automatically become available to carry out the functions allocated to server 2301 according to the present disclosure. In such an embodiment, database 2302 is replicated on at least two such computing devices. In at least one such embodiment, at least two such computing device are electronically interconnected by dual path, redundant electronic interconnection.

Also shown in FIG. 23 are computer network 2304 and computing devices 2305. For purposes of clarity, computer network 2304 is shown in FIG. 23 as a single computer network. Computer network 2304 may, however, comprise a plurality of computer networks. Computer network 2304 may comprise a global computer network, such as, for example, the Internet. Computing devices 2305 are computers, computing devices, or computing systems, such as one or more mainframe computers, workstations, personal computers, laptop computers, hand-held computers, smart phones, tablets, cellular phones, or other Internet-enabled devices. Computing devices 2305 each comprises at least one processor and at least one form of memory, including but not limited to a recordable computer-readable medium. If computer network 2304 comprises the Internet, resident on computing devices 2305 is a software for browsing the Internet and interpreting and displaying webpages, such as, for example, Internet Explorer® or Mozilla® or Safari® or Chrome™. Computing devices 2305 are operated by users of a system for managing and collecting receivables according to the present disclosure.

While this disclosure has been described as having various embodiments, these embodiments according to the present disclosure can be further modified within the scope and spirit of this disclosure. This application is therefore intended to cover any variations, uses, or adaptations of the disclosure using its general principles. For example, any methods disclosed herein and in the appended documents represent one possible sequence of performing the steps thereof. A practitioner may determine in a particular implementation that a plurality of steps of one or more of the disclosed methods may be combinable, or that a different sequence of steps may be employed to accomplish the same results. Each such implementation falls within the scope of the present disclosure as disclosed herein and in the appended claims. Furthermore, this application is intended to cover such departures from the present disclosure as come within known or customary practice in the art to which this disclosure pertains.

What is claimed is:

1. A method for the management and collection of receivables, the method comprising the steps of:
   with a telephone system, performing collection activities, including dialing at least two telephone numbers in a database in an attempt to contact a debtor, wherein the database includes a plurality of debtor records for a plurality of debtors, each of the plurality of debtor records including account information and contact information for one of the plurality of debtors, the account information associated with one or more accounts of said debtor, and the contact information including the at least two telephone numbers associated said debtor, wherein the plurality of debtor records includes at least a first debtor record for a first debtor;
   tracking collection activity results for each of the at least two telephone numbers associated with the first debtor record over a period of time, wherein the collection activity results include (i) a number of contact attempts, (ii) a number of right party calls, and (iii) times associated with each of the contact attempts and the right party calls;
   at a first time of day, computing in real time a contactability score for each of said plurality of debtors, including said first debtor by scoring each of the at least two telephone numbers associated with the first debtor record based upon the collection activity results, wherein scoring each telephone number includes (i) generating an intermediate set of first contactability scores for said telephone number, and (ii) generating a first overall contactability score for said telephone number based on said intermediate set of contactability scores;
   inserting the first debtor record into a dynamic contact queue based on the first overall contactability score for one of the at least two telephone numbers associated with the first debtor, the dynamic contact queue including a plurality of debtor records and associated contact information and a ranked position for each debtor record;
   after inserting the first debtor record into the dynamic contact queue at the first time of day based on the first overall contactability score, (i) moving the first debtor record to a next-to-call position in the dynamic contact queue, and (ii) preventing the autodialer system from automatically calling the first debtor based on the first time of day;
   at a second time of day immediately following the first time of day, re-computing in real time said contactability score for each of said plurality of debtors, including said first debtor by scoring each of the at least two telephone numbers associated with the first debtor record based upon the collection activity results, wherein scoring each telephone number includes (i) generating an intermediate set of second contactability scores for said telephone number, and (ii) generating a second overall contactability score for said telephone number based on said intermediate set of contactability scores;
   moving the ranked position of the first debtor record to the next-to-call position in the dynamic contact queue based on the second overall contactability score;
   displaying account information associated with the first debtor record on a display screen based on the next-to-call position of the contact information associated with the first debtor in the dynamic contact queue;
   automatically sending a control signal to the autodialer to cause the autodialer to call the first debtor using the telephone number associated with the second overall contactability score;
   while the account information associated with the first debtor is displayed on the screen, receiving a trigger to display a call preview section on the graphical user interface; and
   in response to the trigger to display, displaying the call preview section on the graphical user interface simultaneously with the account information of the first debtor, the call preview section including account information for a second debtor associated with an account that is not associated with the first debtor.

2. The method of claim 1 further comprising, amending the account information or contact information associated with the debtor at the second time of day, automatically generating the second overall contactability score for one of the at least two telephone numbers associated with the debtor, and automatically updating the contact queue based on the second overall contactability score such that the ranked position of the first debtor record in the dynamic contact queue changes immediately after amending the account information for the debtor.

3. The method of claim 1 wherein the intermediate set of first and second contactability scores includes:
   a score associated with a number of right party calls using said telephone number within a first predetermined number of days;
   a score associated with no attempts to dial said telephone number within a second predetermined number of days; and
   a score associated with a number of right party calls using said telephone number at a same time as the first or second time of day.

4. The method of claim 1 wherein the first time of day and the second time of day are less than five seconds apart.

5. The method of claim 1 further comprising displaying the at least two telephone numbers associated with the debtor on the display screen along with an indicator of a best telephone number for the debtor based on the second overall contactability score when the account information associated with the debtor is displayed on the display screen.

6. The method of claim 1 wherein the first time of day is associated with an end of a first time period and the second time of day is associated with a start of a second time period.

7. The method of claim 6 wherein the first time period includes at least one hour of the day, and the second time period includes at least one hour of the day immediately following the first time period.

8. A system for managing and collecting receivables comprising:
- a database including a plurality of debtor records, each of the plurality of debtor records including account information and contact information for a debtor, the account information associated with one or more accounts of the debtor, and the contact information including the at least two telephone numbers associated with the debtor;
- an autodialer configured to place calls to debtors using the telephone numbers associated with the debtors;
- a server including one or more processors, the server connected to the autodialer and configured to:
  - track collection activity results for each of at least two telephone numbers associated with each debtor record over the period of days, wherein the collection activity results include (i) a number of contact attempts for the debtor, (ii) a number of right party calls for each of the at least two telephone numbers, and (iii) times associated with each of the contact attempts and the right party calls;
  - during a first time of day associated with a current time period, compute in real time a best contactability score for each debtor by:
    - generating an intermediate set of contactability scores for each of the at least two telephone numbers associated with each debtor, wherein generating the intermediate set of contactability scores includes (i) a first intermediate score associated with the number of contact attempts for the debtor, and (ii) a second intermediate score associated with the number of right party calls using the telephone number during the current time period;
    - generating an overall contactability score for each of the at least two telephone numbers associated with each debtor by arithmetically combining the first intermediate score and the second intermediate score; and
    - determining a best contactability score for each debtor based on a greater overall contactability score for each of the at least two telephone numbers associated with each debtor; and
  - immediately after the first time of day, during a second time of day associated with a start of a subsequent current time period, re-compute in real time a best contactability score for each debtor by repeating the acts of generating an intermediate set of contactability scores, generating an overall contactability score, and determining a best contactability score, and ranking each debtor;
- a dynamic contact queue, which, when operated by the one or more processors:
  - creates a list of debtors to be called based on a ranking of the best contactability score for each of said debtors, wherein said list of debtors in the dynamic contact queue includes a plurality of ranked positions including a next-to-call position;
  - adjusts the list of debtors in the dynamic contact queue based on said ranking during the second time of day, wherein the next-to-call position in the dynamic contact queue changes at the second time of day;
  - prevents the autodialer from calling a first debtor in the next-to-call position of the list of debtors during the first time of day; and
  - allows the autodialer to call the first debtor in the next-to-call position of the list of debtors during the second time of day; and
- a display screen in communication with the dynamic contact queue, the display screen configured to display account information and contact information for the debtor in the next-to-call position on the display screen;
- wherein the autodialer is further configured to automatically dial the one of the telephone numbers for the debtor in the next-to-call position displayed on the display screen.

9. The system of claim 8 wherein the server is further configured to amend the account information or contact information associated with the debtor at the second time of day, automatically generate an amended overall contactability score for one of the at least two telephone numbers associated with the debtor, and automatically update the contact queue based on the amended overall contactability score such that the ranked position of the debtor record in the dynamic contact queue changes immediately after amending the account information for the debtor.

10. The system of claim 8 wherein the intermediate set of first and second contactability scores includes:
- a score associated with a number of right party calls using said telephone number within a first predetermined number of days;
- a score associated with no attempts to dial said telephone number within a second predetermined number of days; and
- a score associated with a number of right party calls using said telephone number at a same time as the first or second time of day.

11. The system of claim 8 wherein the first time of day and the second time of day are less than five seconds apart.

12. The system of claim 8 wherein the display screen is further configured to display the at least two telephone numbers associated with the debtor in the next-to-call position on the display screen along with an indicator of a best telephone number for the debtor based on the overall contactability score.

* * * * *